United States Patent
Hogaboom et al.

(10) Patent No.: US 7,822,851 B2
(45) Date of Patent: Oct. 26, 2010

(54) REMOTE USER COMPUTER CONTROL AND MONITORING

(75) Inventors: Judith F. Hogaboom, King of Prussia, PA (US); Timothy J. Cochrane, Downingtown, PA (US)

(73) Assignee: Internet Probation and Parole Control, Inc., King of Prussia, PA (US)

( * ) Notice: Subject to any disclaimer, the term of this patent is extended or adjusted under 35 U.S.C. 154(b) by 184 days.

(21) Appl. No.: 12/016,385

(22) Filed: Jan. 18, 2008

(65) Prior Publication Data

US 2008/0215722 A1 Sep. 4, 2008

Related U.S. Application Data

(60) Provisional application No. 60/880,977, filed on Jan. 18, 2007, provisional application No. 60/922,910, filed on Apr. 11, 2007.

(51) Int. Cl.
*G06F 15/173* (2006.01)
*G06F 7/04* (2006.01)

(52) U.S. Cl. .................. 709/224; 709/225; 726/2; 726/5

(58) Field of Classification Search ......... 709/223–225; 726/1–5, 22, 26–28
See application file for complete search history.

(56) References Cited

U.S. PATENT DOCUMENTS

| | | | |
|---|---|---|---|
| 6,268,788 B1* | 7/2001 | Gray | 340/5.2 |
| 7,043,048 B1* | 5/2006 | Ellingson | 382/100 |
| 7,333,956 B2* | 2/2008 | Malcolm | 705/50 |
| 7,447,911 B2* | 11/2008 | Chou et al. | 713/186 |
| 7,546,956 B2* | 6/2009 | Adams et al. | 235/472.01 |
| 7,577,739 B2* | 8/2009 | Donahue | 709/224 |
| 2004/0103409 A1* | 5/2004 | Hayner et al. | 717/143 |
| 2007/0016785 A1* | 1/2007 | Guay et al. | 713/176 |
| 2007/0061866 A1* | 3/2007 | O'Toole | 726/2 |
| 2007/0158410 A1* | 7/2007 | Bustamante | 235/380 |
| 2009/0222670 A1* | 9/2009 | Mehta et al. | 713/186 |

* cited by examiner

*Primary Examiner*—Nathan Flynn
*Assistant Examiner*—Joshua Joo
(74) *Attorney, Agent, or Firm*—The Webb Law Firm

(57) ABSTRACT

In a method of computer usage monitoring, a user computer monitors for the input of predetermined keywords or phrases into an application running thereon, the presence of the keywords or phrases in a file received via a computer network, or the launching of one or more predetermined applications or programs. In response detecting the input of one or more of the predetermined keywords or phrases, the presence of one or more of the predetermined keywords or phrases in a file received via the computer network, or the launching of one or more the predetermined applications or programs, the user computer records a digital form of at least one visual image appearing on a video monitor of the user computer. The user computer dispatches the digital form of the recorded image to the server computer via the computer network.

18 Claims, 15 Drawing Sheets

| CASE | MACHINE | STATUS | VERSION | UNINSTALL PASSWORD | INSTALL DATES |
|---|---|---|---|---|---|
| 6542 | 1PPCTRAINING | UNINSTALLED | 8.0.4.4 | UNINSTALLED | OCT 9 2007 8:56 PM OCT 8 2007 2:20 PM |
| 78943 | LAPTOP2 | OFFICER INSTALLED | 8.0.4.4 | GEORGE | OCT 8 2007 2:20 PM |
| 73945 | 1PPCTRAINING | UNINSTALLED | 8.0.4.4 | UNINSTALLED | OCT 10 2007 11:45 AM OCT 10 2007 10:47 PM |
| 6324 | 1PPCTRAINING | UNINSTALLED | 8.0.4.4 | UNINSTALLED | OCT 8 2007 10:14 AM |
| 370931725 | | PENDING SELF INSTALLATION | | GEORGE | N/A |
| 8879647357 | | PENDING SELF INSTALLATION | | GEORGE | N/A |
| PATENT 123 | | PENDING SELF INSTALLATION | | GEORGE | N/A |

FIG. 3A

OPTIONAL CASE CONFIGURATION

TO/FROM B-B ON SHEET 4

TO BE MONITORED USER E-MAIL ADDRESS (OPTIONAL):

PROVIDING AN EMAIL ADDRESS WILL IMMEDIATELY SEND DIRECTIONS ON HOW TO INSTALL THE SOFTWARE TO THE PROVIDED EMAIL ADDRESS

OPTIONAL COMMENT:

THESE COMMENTS WILL BE INCLUDED IN THE EMAIL THAT IS SENT.

CHOOSE THE OFFICER THAT IS ASSIGNED TO THIS CASE

○ GENERAL CASELOAD OFFICER        ○ SEX OFFENDER OFFICER

CREATE NEW CASE

| UNINSTALL DATE | LAST CHECK-IN | CURRENT PAYMENT | REMOVE? |
|---|---|---|---|
| OCT 9 2007 10:48 PM | OCT 9 2007 10:47 PM | | |
| UNINSTALL ON THIS MACHINE | OCT 10 2007 11:13 PM | | |
| OCT 10 2007 11:15 PM | OCT 10 2007 11:13 PM | | |
| OCT 8 2007 2:06 PM | N/A | | |
| N/A | N/A | | REMOVE CASE 370931725 |
| N/A | N/A | | REMOVE CASE 8879647357 |
| N/A | N/A | | REMOVE CASE PATENT 123 |

TO/FROM C-C ON SHEET 3

Internet Management Toolkit

THIS TOOLKIT HAS VARIOUS TOOLS USED TO INSTALL, UNINSTALL, AND VERIFY THAT THE MONITORING SOFTWARE IS INSTALLED CORRECTLY AND FUNCTIONIG PROPERLY. IT ALSO CONTAINS THE TOOLS NECESSARY TO DOWNLOAD AND UPLOAD ENCRYPTED APPLICATION ACTIVITY FILES WHICH HAVE BEEN GENERATED FROM MONITORING THE USER'S MACHINES. CLICK ON THE OPTION BELOW TO AUTOMATICALLY RUN THE SELECTED PROCESS.

- INSTALL IC (INITIAL INSTALL)
  - INTERNET ACCESS
  - NO INTERNET ACCESS
- VERIFY IC INSTALLATION (INSTALL AND FIELD VISIT)
- FIELD VISIT
  - DOWNLOAD DATA BACKLOG
  - UPLOAD DATA BACKLOG
- UNINSTALL IC
- BIOMETRIC DEVICE
  - BIOMETRIC INSTALL
  - ENROLL USERS
- CHECK FOR UPDATES

CLOSE

FIG. 5

TO/FROM D-D ON SHEET 12

| PRINT THIS PAGE | | | | | |
|---|---|---|---|---|---|
| CURRENT PAGE: 1 OF 1 | | | TOTAL IMPRESSIONS: 4 | | |
| SOURCE | SITE | CLEAR | SAVE | SUBJECT | WEB CATEGORY |
| MaD | prickles4me@verizon.net | ☐ AUTO | ☐ | THE NAZI PARTY IS ALIVE | N/A |
| MAIL | prickles4me@verizon.net | ☐ AUTO | ☐ | USE THIS SWASTIKA | N/A |
| WEB | www.churchoftrueisrael.com | ☐ AUTO | ☐ | WELCOME TO THE CHURCH OF TRUE ISRAEL RACIAL INFORMATION SERMONS BY swiftcomparetemahiser-galehitlercox AND OTHERS | NOT CATEGORIZED |
| ERROR | AUTO-FIX | ☐ AUTO | ☐ | COMPONENTS DISTURBED AND AUTOMATICALLY RESTORED | N/A |
| | | CLEAR ☐ | SAVE ☐ | | |
| CURRENT PAGE: 1 OF 1 | | | TOTAL IMPRESSIONS: 4 | | |

FIG. 8A

| IMAGE FILE | LOG DATA | USER | COMPUTER NAME | CASE # | CONTROL |
|---|---|---|---|---|---|
| DOWNLOAD (1.44 KB) | 12/28/2007 9:52:37PM | skinners | IPPPCTRAINING | 6542 | KEYWORD: NAZI |
| DOWNLOAD (4.00 KB) | 12/28/2007 9:51:06 PM | skinners | IPPPCTRAINING | 6542 | SWASTIKA |
| | 12/28/2007 9:46:02 PM | skinners | IPPPCTRAINING | 6542 | |
| | 12/28/2007 9:41:48 PM | skinners | IPPPCTRAINING | 6542 | *CHURCHOFTRUEISRAEL.COM* |
| | | | | | |

TO/FROM D-D ON SHEET 11

FIG. 8B

CASE - Bio9999
BIOMETRIC DETAIL REPORT BY CASE

PRINTED DATE: 1/8/2008 1:37:14 PM    DATE RANGE: 05/10/2007-01/07/2008

REPORT DESCRIPTION - DISPLAYS DETAILED DATA FOR A CASE INSTALLED WITH THE BIOMETRIC DEVICE OVER A CERTAIN PERIOD OF TIME.

| DATE | SUBJECT | USER ACCOUNT |
|---|---|---|
| 11/16/2007 8:35:34AM | BIOMETRIC SCAN MATCHED CURRENT USER. | BIO-BETTY |
| 11/16/2007 8:37:57AM | BIOMETRIC SCAN DID NOT MATCH CURRENT USER! | BIO-BETTY |
| 11/16/2007 8:38:03AM | BIOMETRIC SCAN DID NOT MATCH CURRENT USER! | BIO-BETTY |
| 11/16/2007 8:52:44AM | BIOMETRIC SCAN MATCHED CURRENT USER. | BIO-BETTY |
| 11/16/2007 8:54:52AM | BIOMETRIC SCAN DID NOT MATCH CURRENT USER! | BIO-BETTY |
| 11/16/2007 8:54:55AM | BIOMETRIC SCAN DID NOT MATCH CURRENT USER! | BIO-BETTY |
| 11/16/2007 8:54:57AM | BIOMETRIC SCAN MATCHED CURRENT USER. | BIO-BETTY |
| 11/16/2007 8:56:15AM | BIOMETRIC SCAN DID NOT MATCH CURRENT USER! | BIO-SPOUSE |
| 11/16/2007 8:56:19AM | BIOMETRIC SCAN DID NOT MATCH CURRENT USER! | BIO-SPOUSE |
| 11/16/2007 8:56:23AM | BIOMETRIC SCAN MATCHED CURRENT USER. | BIO-SPOUSE |
| 11/16/2007 8:59:08AM | BIOMETRIC SCAN MATCHED CURRENT USER. | BIO-SPOUSE |
| 11/16/2007 9:03:54AM | BIOMETRIC SCAN MATCHED CURRENT USER. | BIO-BETTY |
| 11/16/2007 9:19:28AM | BIOMETRIC SCAN MATCHED CURRENT USER. | BIO-BETTY |
| 11/16/2007 9:23:32AM | BIOMETRIC SCAN MATCHED CURRENT USER. | BIO-BETTY |
| 11/16/2007 9:23:37AM | BIOMETRIC SCAN MATCHED CURRENT USER. | BIO-BETTY |

FIG. 9

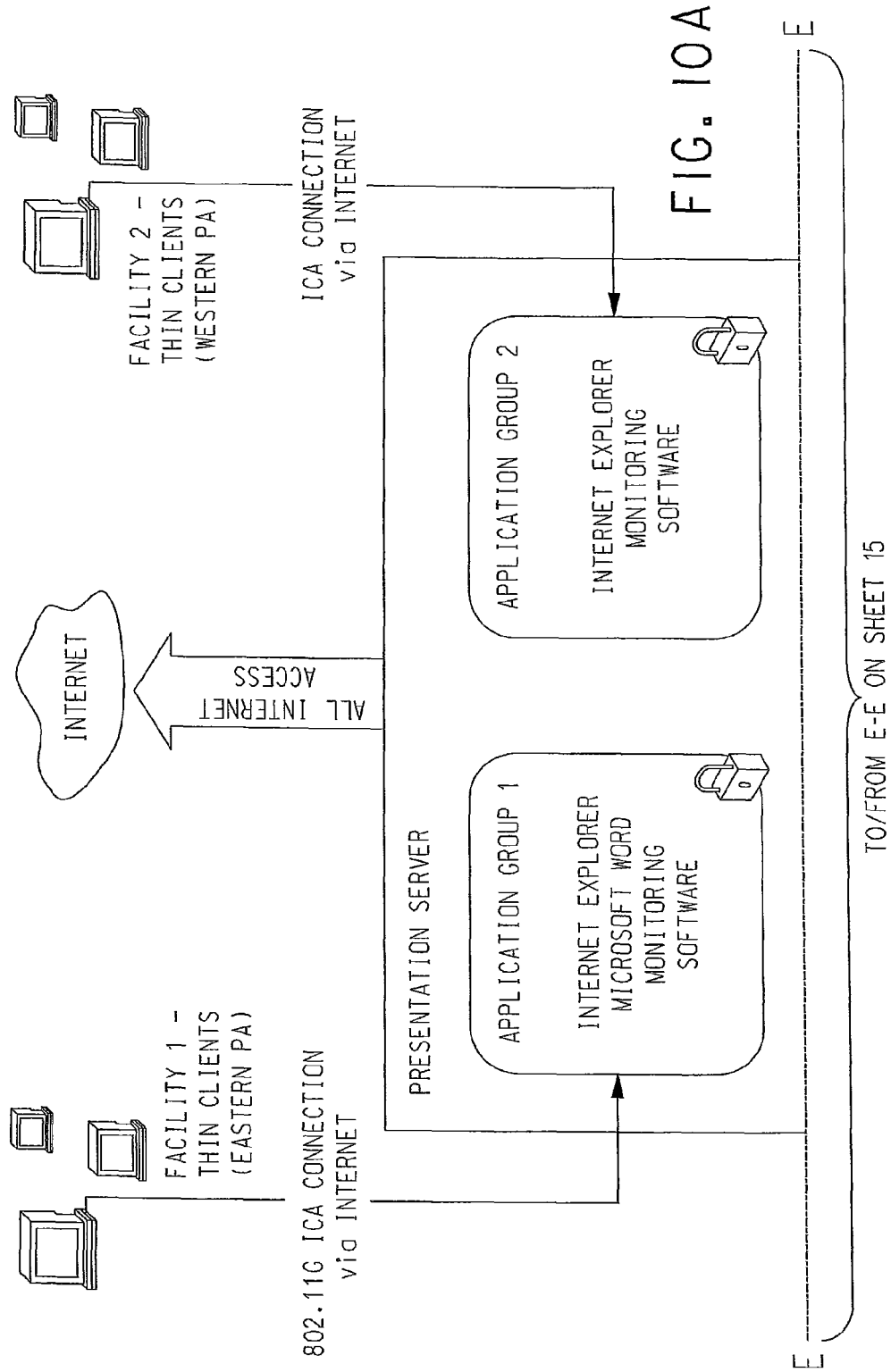

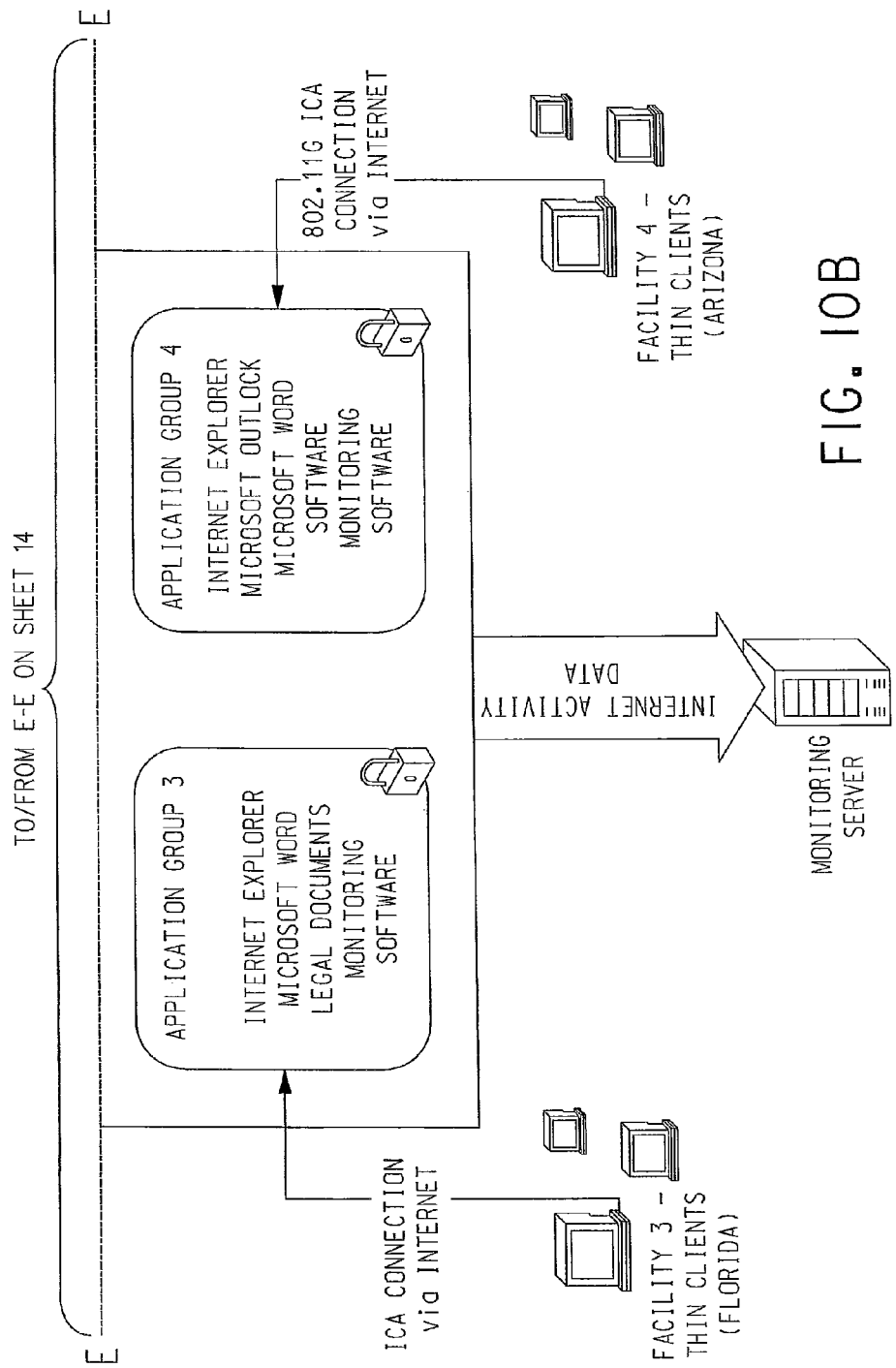

REMOTE USER COMPUTER CONTROL AND MONITORING

CROSS REFERENCE TO RELATED APPLICATION

The present application claims priority from U.S. provisional application No. 60/880,977, filed Jan. 18, 2007, and U.S. provisional application No. 60/922,910, filed Apr. 11, 2007, both of which are incorporated herein by reference.

BACKGROUND OF THE INVENTION

1. Field of the Invention

The present invention relates to managing computer and Internet activities of individuals that have been deemed by a court to present a safety risk to the community.

2. Description of Related Art

U.S. Federal and State courts have adopted the doctrine of "least restrictive alternative" when implementing supervision conditions by which community corrections agencies monitor high risk individuals that present safety risks to the community and the officer(s) that supervise(s) them. To this end, in 2002 the U.S. Federal courts deemed that a complete ban on Internet use was overly restrictive, but recognized the need for monitoring such Internet use. Since then, U.S. courts have consistently upheld this position and have expanded upon it, to address privacy concerns associated with monitoring Internet use, recognizing the need to preserve the rights of privacy and confidentiality of those on supervision, as well as their 4th Amendment rights protected by the constitution.

Courts can mandate computer and Internet monitoring restrictions on offenders and defendants deemed to present a risk to the community. These risks can include, but are not limited to, child pornography access and/or dissemination, child lurings, hacking, identity theft, Internet fraud, drug and human trafficking and all other types of Internet related crimes. In addition, restrictions may be imposed upon those that are charged and/or convicted of offenses where the computer is seen as an aggravator, such as legal adult pornography as a facilitator to rape. Courts can also order the duration of when monitoring should commence and cease. In many cases, such duration is adjusted based on the offender's behavior, or in the case of defendants, whether guilt or innocence prevails.

Courts have deemed remote Internet monitoring as the preferred approach. However, concerns have been expressed that a technology that did not offer remote viewing and access and which permitted data to remain on the offender's machine, would be vulnerable to data tampering and/or deletion, thus presenting a greater risk to the community.

SUMMARY OF THE INVENTION

The present invention is embodied in computer software that can be installed on the personal computer, home computer, and/or work computer of an individual deemed by a court to be a high risk individual that presents safety risks to the community. The software is operative for managing the computer and Internet access of the computer under the control of the individual and for reporting the occurrence of certain restricted acts or high risk activities regarding actual or attempted Internet access by the individual to an appropriately configured remote server computer operating under the control of a third party. The server computer stores any restricted acts that have been reported for the individual for subsequent retrieval and analysis by another individual, such as, for example, without limitation, a case manager, a parole officer, a police officer or a court official.

The server computer can be operative for dispatching an electronic notice, such as a text message or an e-mail, to a predetermined address of a device of the other individual in response to receiving a report of the occurrence of a restricted act.

The present invention promotes one or more of the following: community safety; officer safety which translates into minimizing the time at an offender's computer with an officer in the presence of the offender; 4th Amendment rights regarding inappropriate search and seizure and privacy rights of the offenders and other utilizing the computer; program integrity by reducing the likelihood of offenders removing or tampering with system files installed on their computers; the identification of high risk behavior; rapid notification to those supervising the monitored and controlled users; data integrity for court presentation; and the confidentiality and anonymity of the managed user.

More specifically, one embodiment of the invention enables setting of conditions in the computer software installed on the individual's computer for when screenshots should be taken. For example, officers can include their names and judges' names in a code segment of the computer software (called a Records Identifier and Sorting by Keywords, phrases and Applications (R.I.S.K.)) that monitors for screenshot triggering conditions with optional officer alert notification. Thereafter, if an offender performs an Internet search for, for example, an officer's name (i.e., a triggering condition), screenshots of the monitor of the individual's computer can be acquired based on the officer's name appearing in the search field and said screenshots can be forwarded to the server computer for storage. Optionally, the officer can be notified via, for example, without limitation, text message and/or e-mail, that his name had been the subject of an Internet search on the individual's computer being monitored. The officer can then log into an interface that accesses the remote server from his computer and can view the captured screenshots. The officer can then act on this information in an appropriate manner, e.g., obtain a search warrant for the offender's home, summon appropriate police authority and search the offender's computer.

Also or alternatively, the embodiment of the invention can permit officers to deny the individual Internet access and ports, including peer2peer, VMWare, remote desktop applications and internal networks. Should the individual attempt to gain access to an Internet connection, e.g., via a neighbor's wireless router, a code segment of the software installed on the individual's computer will block such access and the officer will optionally be notified that the individual has attempted a violation of the conditions of his computer use. Desirably, one IP address can be left open, namely the IP address of the remote server, so that the violation notice can arrive at the server computer for subsequent review by the officer.

Over time, the courts have favored utilizing a least restrictive approach that does not compromise the effectiveness of supervision. For example, courts do not look favorably on technologies that capture and store the private business bank statements of a sex offender's spouse. Furthermore, communications between individuals and their treatment providers and/or attorneys are deemed protected communications and cannot be captured and stored. The computer software of the present invention installed on the personal or home computer of an individual allows for multiple configurations including what is NOT captured.

Moreover, courts are stipulating that only individuals with monitoring conditions be monitored and/or controlled. The computer software of the present invention can be configured to ONLY monitor court designated individuals. To this end, a suitable biometric scanner, e.g., a fingerprint or retinal scanner, can be operatively coupled to the individual's computer and operative under the control of the computer software of the present invention to occasionally or periodically require a user of the computer to perform a biometric scan on the biometric scanner to confirm their identity. In this manner, it can be ensured that the court designated individual is present at the computer during use, thereby avoiding the unauthorized use of the individual's username and password and the "it wasn't me" defense.

Moreover, each individual is unique. While some Internet access controls may be applied to all individuals (offenders/defendants) in a category, the computer software of the present invention desirably allows for the unique paraphilias and afflictions of each individual. For example, an individual with a foot fetish may be restricted from viewing the shoe section of an online retail catalog, while restricting another individual from the same material may be viewed as overly restrictive. Therefore, the computer software of the present invention is desirably configurable to meet the unique needs of each individual. For example, victims' names can be blocked from access. In this way, if an individual was attempting to do a search on a victim, such search would be blocked and the officer would optionally be notified.

The computer software of the present invention enables the conditions placed on an individual (offender/defendant) to be determined at the commencement of supervision or be modified as necessary, resulting from the behavior of the individual elicited during supervision. Therefore, the computer software of the present invention is desirably adaptable and responsive to changes. To this end, new controls and/or configurations can be implemented in the computer software of the present invention rapidly, remotely and nearly in real time. For example, if a court deems it appropriate to establish an Internet curfew if an offender is viewing pornography at 2 am, or if the offender cannot control his/her impulses at all, the computer software of the present invention can be configured to permit access to an "allow list" of resources, such as, without limitation, sanctioned websites, newsgroups, e-mail addresses, ftp addresses and chatroom addresses. For example, for an individual that has a paraphilia with water, blocking by keyword or site is difficult because a vast number of web pages include some reference to water, i.e., rain, beaches, snow, weather. To overcome this, the computer software of the present invention includes an "allow list" of where the individual is permitted to navigate and from whom to receive and send e-mails.

The computer software of the present invention can be installed in-person in the individual's personal or home computer or can be download into the computer from the server computer.

The court can stipulate as a condition of an individual's supervision that Internet access be managed by a third party, e.g., without limitation, a case manager. The computer software of the present invention can be configured to permit such management. For example, in a fraud case, the computer software of the present invention can be configured to block the e-mail addresses of co-defendants. In other cases, communications or search information about victims may be considered a violation of the individual's supervision conditions Internet use. All of these stipulations can be reflected in the configuration profile computer software of the present invention for each individual (offender/defendant).

More specifically, an embodiment of the present invention is a method of computer usage monitoring. The method includes (a) causing a user computer to be in communication with a server computer via a computer network; (b) causing a listing of keywords, phrases, applications and/or programs to reside on the user computer; (c) causing the user computer to automatically monitor for: keywords or phrases input by the user into an application running on the user computer; the presence of keywords or phrases in a file received by the user computer via the computer network; or the launching of one or more applications or programs on the user computer; (d) in response to the user computer detecting (1) the input of one or more of the listed keywords or phrases into an application running on the user computer, (2) the presence of one or more of the listed keywords or phrases in a file received by the user computer via the computer network, or (3) the launching of one or more the listed applications or programs on the user computer, causing the user computer to record a digital form of at least one visual image appearing on a video monitor of the user computer; and (e) causing the user computer to dispatch the digital form of the recorded image to the server computer via the computer network.

The file of step (c) can be a web page. The computer network can be the Internet.

Step (d) can include occasionally or periodically recording a plurality of images appearing on the video monitor of the user computer.

The method can further include causing the server computer to store the digital form of the recorded visual image communicated in step (e) on a storage medium; via the server computer, recalling the stored digital form of the recorded visual image from the storage medium; and causing the recalled digital form of the recorded visual image to be displayed as a visual image on a video monitor associated with a computer other than the user computer.

Also or alternatively, the method can further include causing the user computer to determine a first hash value for the digital form of the recorded visual image; causing the user computer to communicate the first hash value to the server computer via the computer network; causing the server computer to compute a second hash value for the digital form of the recorded visual image received at the server computer; causing the server computer to compare the first and second hash values; and, in response to determining that the first and second hash values match, the server computer storing in connection with the digital form of the recorded visual image an indication of said match between the first and second hash values.

Step (d) can further include blocking the dispatch of the application or the listed keywords or phrases entered into the application from the user computer to the computer network; blocking the dispatch of a response entered into the file via the computer network; or blocking the input or output of data into or from the launched application or program.

Also or alternatively, the method can further include storing in the user computer via a biometric device coupled to the user computer biometric data regarding a user of the user computer; causing the user computer to occasionally or periodically output on its video monitor a prompt for biometric input into the biometric device within a predetermined interval of time; and responsive to the lack of biometric input into the biometric device within the predetermined interval of time or the input of biometric data that does or does not match the biometric data stored in the user computer, dispatching an indication of said lack of biometric input or said match to the server computer via the computer network.

Also or alternatively, the method can further include, in response to determining the absence of one or more predetermined programs installed thereon, the user computer downloading said one or more predetermined programs from the server computer via the computer network and installing said downloaded one or more predetermined programs thereon.

Another embodiment of the present invention is a computer monitoring method that includes (a) providing a user computer coupled in communication with a server computer via a computer network, the user computer having a biometric device operatively coupled thereto; (b) storing in the user computer via the biometric device, biometric data regarding a user of the user computer; (c) causing the user computer to occasionally or periodically output on a video monitor thereof a prompt for biometric input into the biometric device within a predetermined interval of time; and (d) responsive to the lack of biometric input into the biometric device within the predetermined interval of time or the input of biometric data that does or does not match the biometric data stored in the user computer, dispatching an indication of said lack of biometric input or said match to the server computer via the computer network.

The method can further include causing the user computer to automatically monitor for predetermined keywords or phrases input by the user into an application running on the user computer, the presence of predetermined keywords or phrases in a file received by the user computer via the computer network, or the launching of one or more predetermined applications or programs on the user computer; in response to the user computer detecting the input of one or more of the predetermined keywords or phrases into an application running on the user computer, the presence of one or more of the predetermined keywords or phrases in a file received by the user computer via the computer network, or the launching of one or more the predetermined applications or programs on the user computer, causing the user computer to record a digital form of at least one visual image appearing on a video monitor of the user computer; and causing the user computer to dispatch the digital form of the recorded image to the server computer via the computer network.

Also or alternatively, the method can further include, in response to determining the absence of one or more predetermined programs installed thereon, the user computer downloading said one or more predetermined programs from the server computer via the computer network and installing each downloaded program thereon.

Lastly, another embodiment of the present invention is a computer monitoring method that includes (a) causing a listing of predetermined program files and/or plug-ins to reside on a user computer that is coupled in communication with a server computer via a computer network; (b) causing the user computer to detect for the presence or absence of one or more of said predetermined program files and/or plug-ins; (c) in response to detecting the absence of one or more of said predetermined program files and/or plug-ins, the user computer downloading said one or more absent predetermined programs and/or plug-ins from the server computer via the computer network; and (d) causing the user computer to install thereon said downloaded one or more predetermined programs and/or plug-ins.

The method can further include providing a biometric device operatively coupled to the user computer; storing in the user computer via the biometric device, biometric data regarding a user of the user computer; causing the user computer to occasionally or periodically output on a video monitor thereof a prompt for biometric input into the biometric device within a predetermined interval of time; and responsive to the lack of biometric input into the biometric device within the predetermined interval of time or the input of biometric data that does or does not match the biometric data stored in the user computer, dispatching an indication of said lack of biometric input or said match to the server computer via the computer network.

Also or alternatively, the method can further include causing the user computer to automatically monitor for predetermined keywords or phrases input by the user into an application running on the user computer, the presence of predetermined keywords or phrases in a file received by the user computer via the computer network, or the launching of one or more predetermined applications or programs on the user computer; in response to the user computer detecting the input of one or more of said predetermined keywords or phrases into an application running on the user computer, the presence of one or more of said predetermined keywords or phrases in a file received by the user computer via the computer network, or the launching of one or more said predetermined applications or programs on the user computer, causing the user computer to record a digital form of at least one visual image appearing on a video monitor of the user computer; and causing the user computer to dispatch the digital form of the recorded image to the server computer via the computer network.

BRIEF DESCRIPTION OF THE DRAWINGS

FIGS. 3A-3D are an exemplary case management interface and a "create new case" dialog box that can be displayed on the home or personal computer of a user shown in FIG. 1;

FIG. 5 is an Internet Management Toolkit interface that facilitates the selection of various of options on the computer software in accordance with an embodiment of the present invention installed on the home or personal computer of a user shown in FIG. 1;

FIGS. 8A-8B are a control panel that can be displayed on the monitoring computer of FIG. 1 under the control of the server computer of FIG. 1, wherein the control panel displays information regarding the use of one or more home or personal computers of a user of the type shown in FIG. 1;

FIG. 9 is a biometric report of the response of a user of the home or personal computer of a user shown in FIG. 1 in response to authenticating the users biometric information on the biometric device coupled to the computer; and FIGS. 10A-10B are a block diagram of an architecture of the computer software of the present invention implemented utilizing a Citrix Presentation Server.

DETAILED DESCRIPTION OF THE INVENTION

The present invention will be described with reference to the accompanying figures where like reference numbers correspond to like elements.

Figure 1:
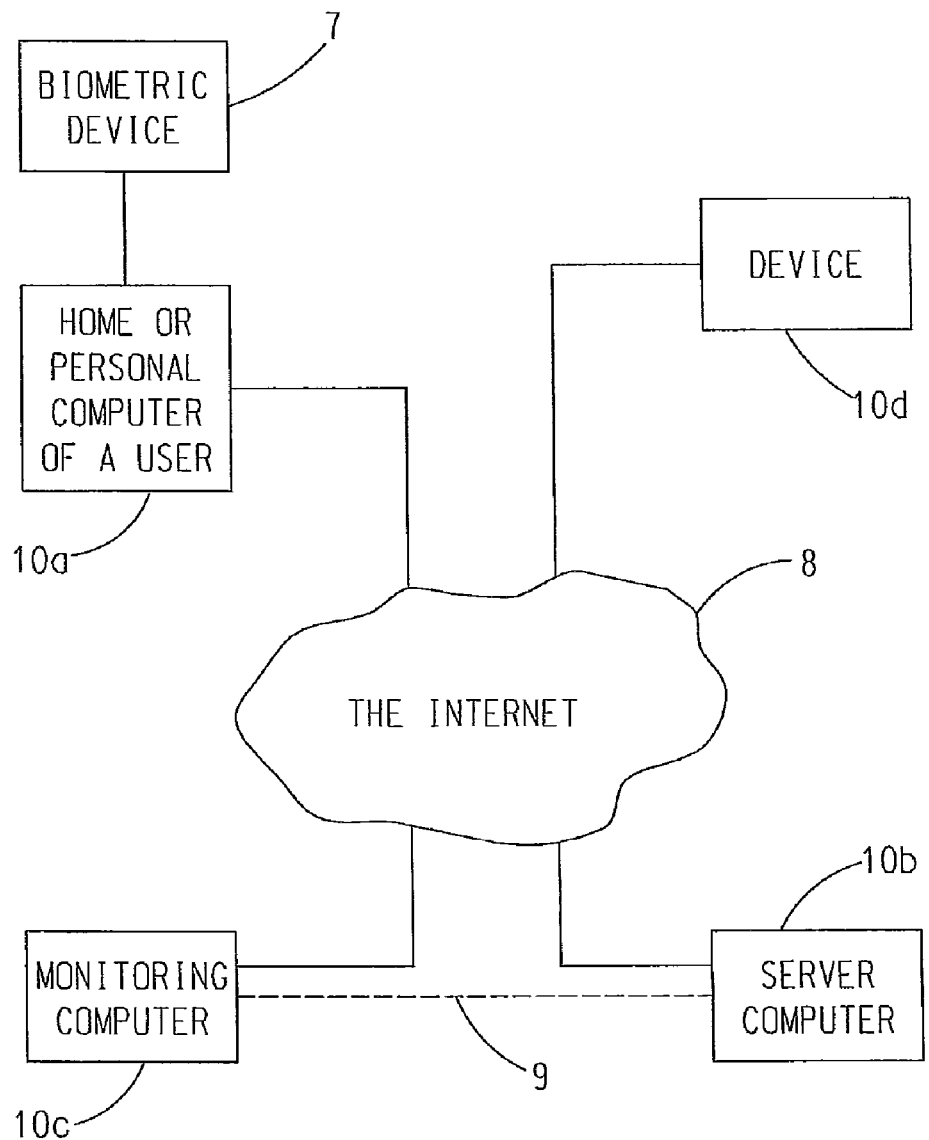
FIG. 1 is a block diagram of an exemplary network of computers/devices that are communicatively coupled via a computer network, e.g., the Internet, or directly, wherein the illustrated home or personal computer of a user includes a biometric device operatively coupled thereto.

With reference to FIG. 1, the present invention is embodied in computer software which can be installed on the personal computer, home computer, work computer, school computer, etc. 10a (hereinafter "user computer") of an individual deemed by a court to be a high risk individual that presents safety risks to the community. The software is operative for managing the Internet access of user computer 10a that is under the control of the individual and for reporting the occurrence of certain restricted acts and high risk activities regarding actual or attempted computer and Internet access by the individual to an appropriately configured remote server computer 10b via the Internet 8. The remote server computer 10b is desirably operated under the control of a third party not affiliated with the individual operating the user computer 10a. Server computer 10b stores any restricted acts that have been reported by the computer software of the present invention operating on the user computer 10a for subsequent retrieval and analysis by a monitor computer 10c coupled to the server computer 10b either via the Internet 8 or via a direct link 9 (shown in phantom in FIG. 1). Also or alternatively, the reported restricted acts may be acquired directly from server computer 10b.

Server computer 10b can be configured whereupon in response to receiving a report of the occurrence of a restricted act from user computer 10a, server computer 10b can optionally dispatch an electronic notice, such as a text message, an e-mail, and the like, to a predetermined address of a device 10d of another individual responsible for reacting to the report of the occurrence of a restricted act, such as, for example, a case manager, a parole officer, police officer or a court official, that may access any reported restricted acts stored on server computer 10b via device 10d, if appropriately configured, or monitor computer 10c. Device 10d can be a cell phone, a PDA, a desktop computer, a laptop computer, a pager and/or any suitable and/or desirable electronic device capable of receiving an electronic notice in response to server computer 10b receiving a report of the occurrence of a restricted act. For the purpose of the present description, hereinafter, it will be assumed that device 10d is a personal computer (laptop or desktop). However, it is not to be construed as limiting the invention.

Figure 2:
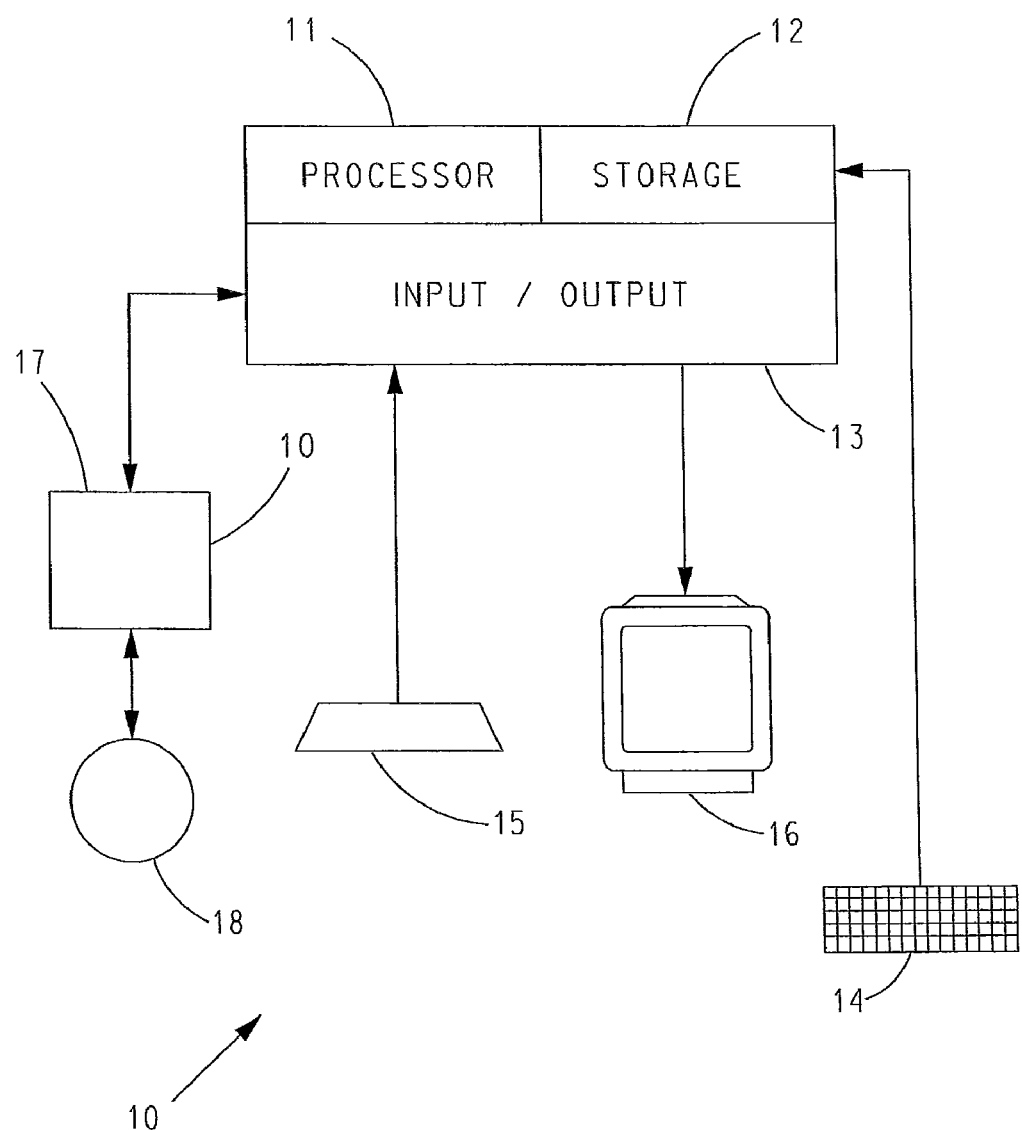
FIG. 2 is a block diagram of the components comprising a computer/device of the types shown in FIG. 1.

With reference to FIG. 2, each computer system 10 shown in FIG. 1 includes a microprocessor 11, a storage 12 and an input/output system 13. Storage 12 is configured to store computer readable program code (or computer software) 14 which, when executed by microprocessor 11, is capable of implementing one or more aspects of the present invention described hereinafter.

Each computer system 10 can also include a media drive 17, such as a disk drive, CD ROM drive, or the like. Media drive 17 may operate with a computer useable storage medium 18 capable of storing the computer readable program code 14 that is run from storage 12 during operation of computer system 10. Input/output system 13 may also include a keyboard/mouse 15 and/or display 16. The illustration of computer system 10 in FIG. 2, however, is not to be construed as limiting the invention since it is envisioned that a computer system having any suitable and/or desirable combination of elements known in the art can be utilized for implementing the present invention.

In practice, the process of managing the computer and Internet begins with the court ordered condition of supervision on an individual (offender/defendant) that, among other things, conditions of the individual's computer and Internet access. Thereafter, at a suitable time, computer software 14 is installed on user computer 10a via a suitable case management interface, like the interface shown in FIG. 3. For the purpose of describing the present invention, hereinafter computer software 14 will only be described as being installed on a user computer 10a.

The case management interface enables tracking of an officer's case management. Via the case management interface, officers will be able to see for each case the status of the installation and the version of the computer software 14 running on user computer 10a. Computer software 14 running on user computer 10a is configured and operative for automatically updating itself from server computer 10b. However, if there is a problem with the update, this can be reflected in the case management interface.

The case management interface may also include for each case an "uninstall password" field that is automatically populated for the installing officer performing a field uninstall of computer with software 14 to be uninstalled from user computer 10a. To protect the integrity thereof, the computer software 14 running on user computer 10a is configured so that it cannot be uninstalled through "add/remove" programs. To this end, the computer software 14 running on user computer 10a has a "smart healing" module. Should an offender/defendant remove components of the computer software 14 running on user computer 10a, "smart healing" module of said computer software 14 will automatically reinsert the damaged or missing files. When this occurs, the "smart healing" module will dispatch a message to server computer 10b that "smart healing" module of the computer software 14 running on user computer 10a has automatically reinserted a file. This message is stored in server computer 10b in a file associated with the individual (offender/defendant) for subsequent retrieval and analysis by personnel tasked with monitoring such data, e.g., a case manager or parole officer.

Desirably, the computer software 14 running on user computer 10a can only be uninstalled in a limited number of ways: e.g., via a Menu on a so-called Internet Management Toolkit (described hereinafter); via an uninstall file of the computer software 14 running on user computer 10a and a predetermined uninstall password; or remotely by selecting a link, e.g., "Uninstall on this machine", displayed on a case management interface that causes a software module resident on server computer 10b to uninstall the computer software 14 running on user computer 10a.

Figure 3B:
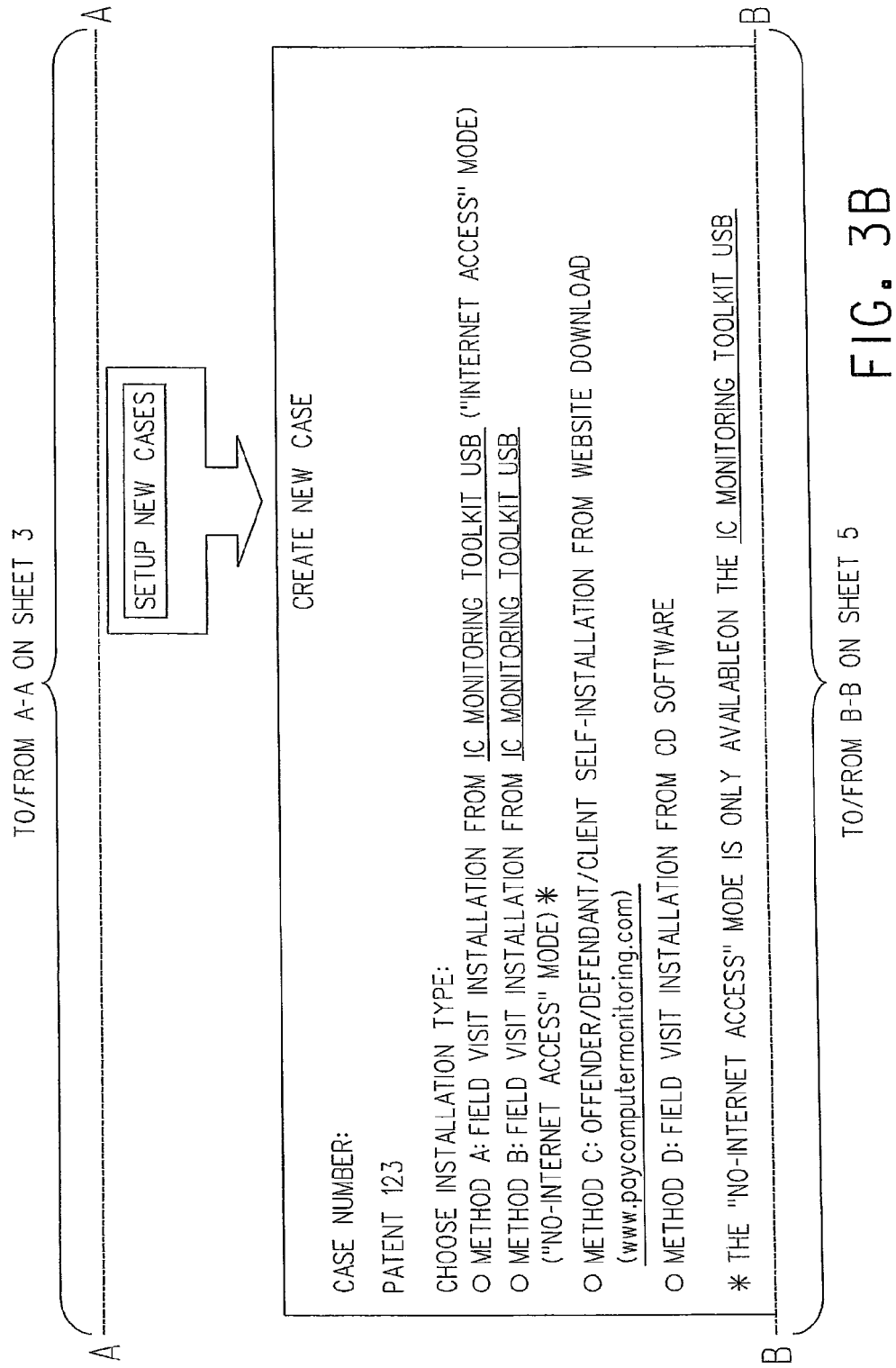

As shown in FIG. 3, case management interface can also include for each case an "Install Date" field that indicates when the computer software 14 running on user computer 10a was installed; and an "Uninstall Date" field for each case that indicates when the computer software 14 running on user computer 10a was uninstalled, if appropriate. Case management interface can further include a "Last Check In" field for each case that is continually updated and tells the officer the last time the computer software 14 running on user computer 10a installed on computer 10a had a successful handshake with server computer 10b.

Case management interface can further include a "Current Payment" field that indicates if payment by the individual (offender/defendant) for the monitoring provided by the computer software 14 running on user computer 10*a* is current (this payment may be a precondition of the individual's use of the computer software 14 running on user computer 10*a*).

Case management interface can further include a "Remove Case" field that indicates the individual's computer and Internet access is no longer being monitored.

Figure 4:
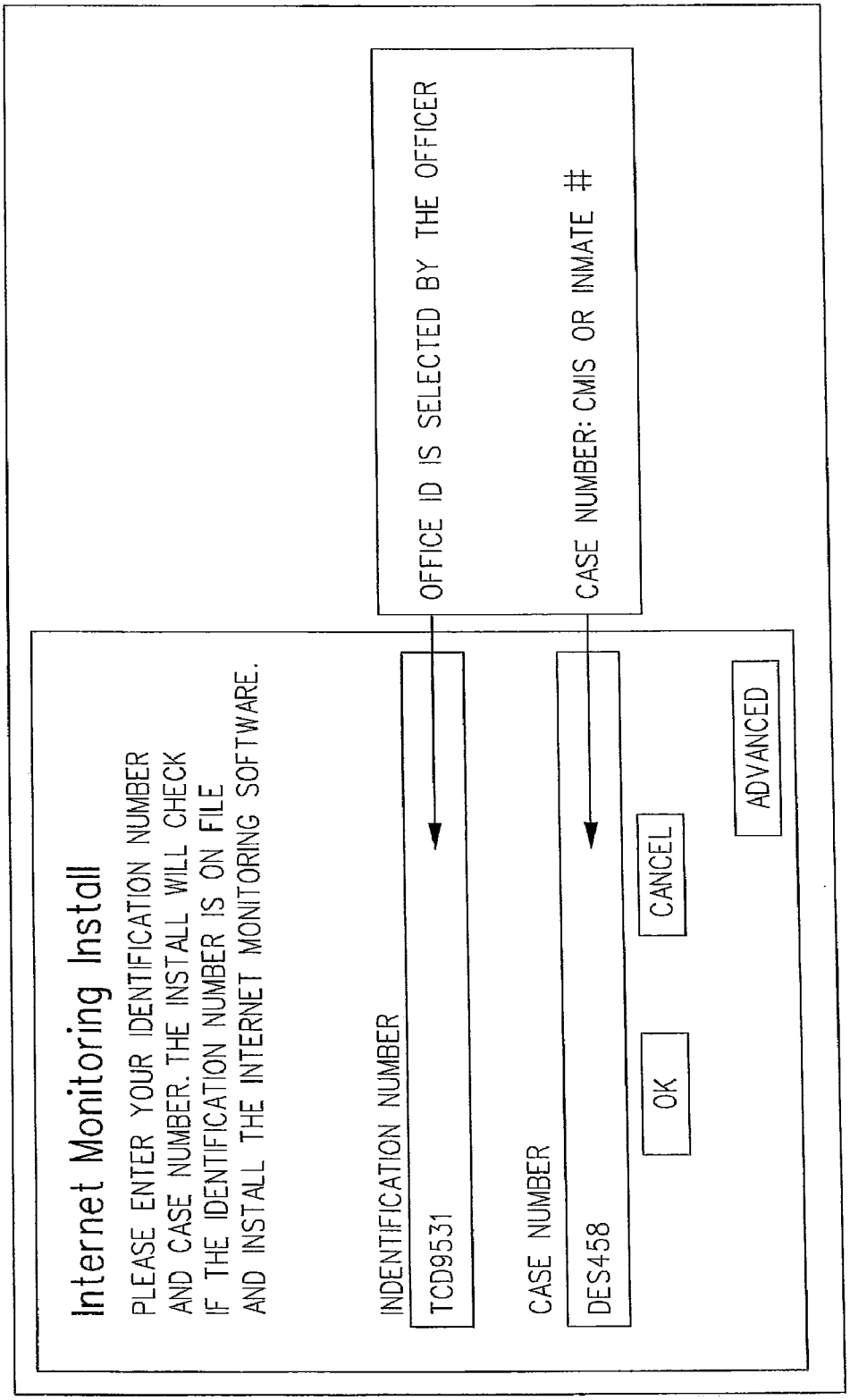
FIG. 4 is an installation interface that is useable for installing computer software in accordance with an embodiment of the present invention on the home or personal computer of a user shown in FIG. 1.

The computer software 14 running on user computer 10*a* can be installed via install software that resides on, for example, a CD ROM (or any other suitable and/or desirable portable storage medium, such as a flash drive), via a Menu on a so-called Internet Management Toolkit (described hereinafter) and that automatically loads the install software which, then prompts the installing officer with the install interface shown in FIG. 4 to input their Officer ID and the individual's (offender's/defendant's) case number or remotely from the case management interface that causes a software module resistant on server computer 10*b* to install computer software 14 on user computer 10*a*.

Via the Internet Management Toolkit interface of FIG. 5, the installing officer can: select to have the computer software 14 running on user computer 10*a* permit or deny the offender Internet access; verify installation of the computer software 14 running on user computer 10*a*; upload or download data from or to computer 10*a* regarding offender computer use (used for no-Internet-access installations) for use by the computer software 14 running on user computer 10*a*; uninstall the computer software 14 running on user computer 10*a*; enable biometric capability of the computer software 14 running on user computer 10*a*; enroll a user(s) for the biometric for the use of the computer software 14 running on user computer 10*a*; and check for updates to the computer software 14 running on user computer 10*a*.

Figure 6:
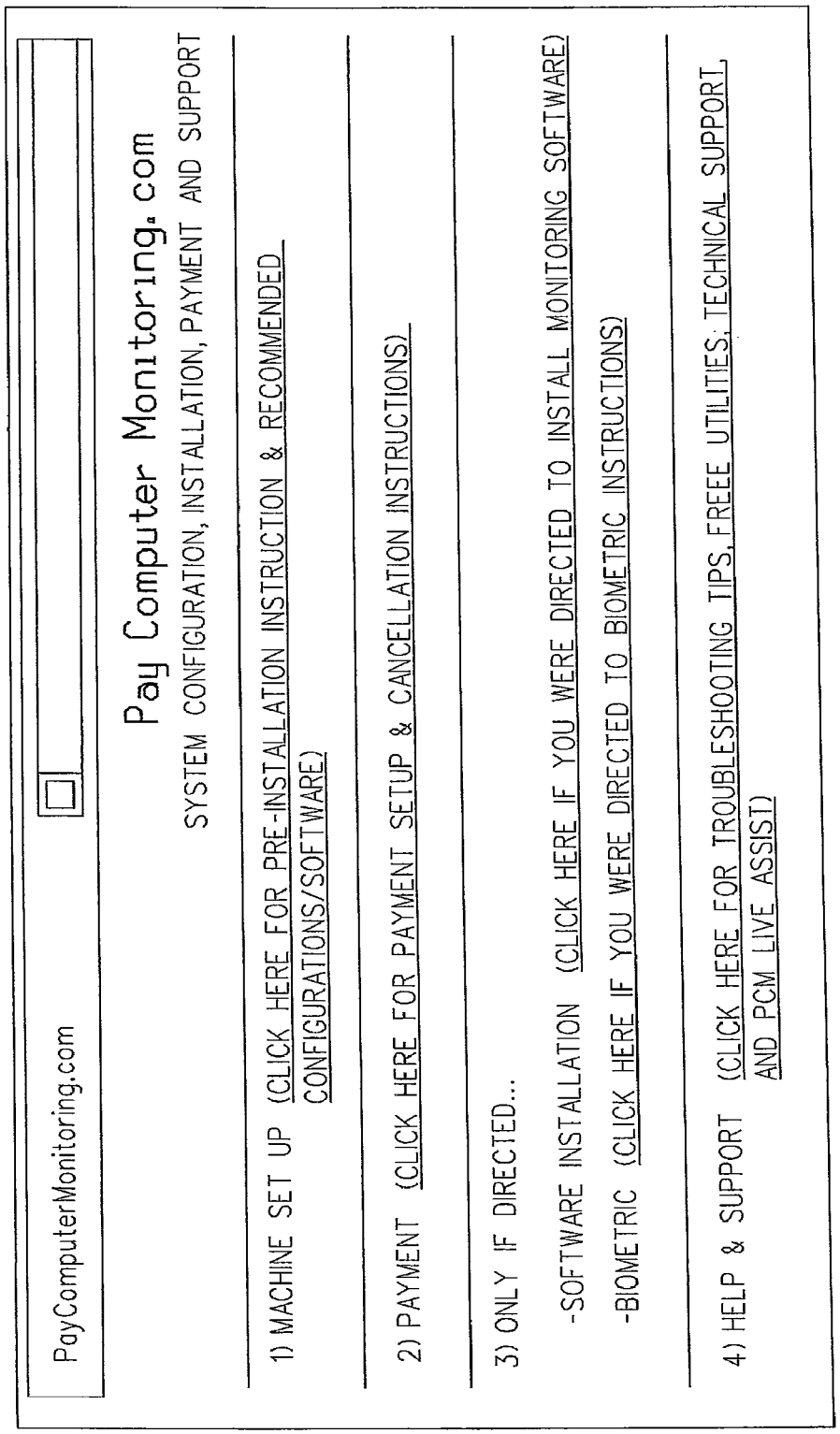
FIG. 6 is another interface that can be displayed on the home or personal computer of a user shown in FIG. 1 that facilitates the running of diagnostics on the computer, the installation of the computer software in accordance with an embodiment of the present invention on the computer, the selection of whether or not a biometric device is coupled to the computer, and the payment for the use of the computer software of the present invention on the computer.

Next, the install software causes the interface of FIG. 6 to be displayed. Via the interface of FIG. 6, the individual (offender/defendant) can post e-mail communications regarding the monitoring service. The interface of FIG. 6 can also include a Machine Setup option that runs diagnostics on computer 10*a* dispatches the results of the diagnostics to server computer 10*b* for evaluation to ensure proper installation of the computer software 14 on user computer 10*a*.

After computer 10*a* diagnostics are completed and evaluated, the individual (offender/defendant) is instructed to perform the Software Installation step that installs the computer software 14 on the user computer 10*a*. To install the computer software 14 on the user computer 10*a*, the individual (offender/defendant) is prompted to insert his/her case number into an appropriate interface on computer 10*a*. Thereafter, a verification will occur, requesting the individual (offender/defendant) to confirm that the case number entered is properly mapped to the correct database/officer account.

Once computer software 14 is installed on user computer 10*a*, an appropriate field of the case management interface of FIG. 3 will be updated to reflect the install date and said computer software 14 will cause the officer linked to the account to receive (at device 10*d* and/or monitor computer 10*c*) an e-mail or other suitable notification from server computer 10*b* indicating that computer software 14 was installed on user computer 10*a*.

Figure 7:
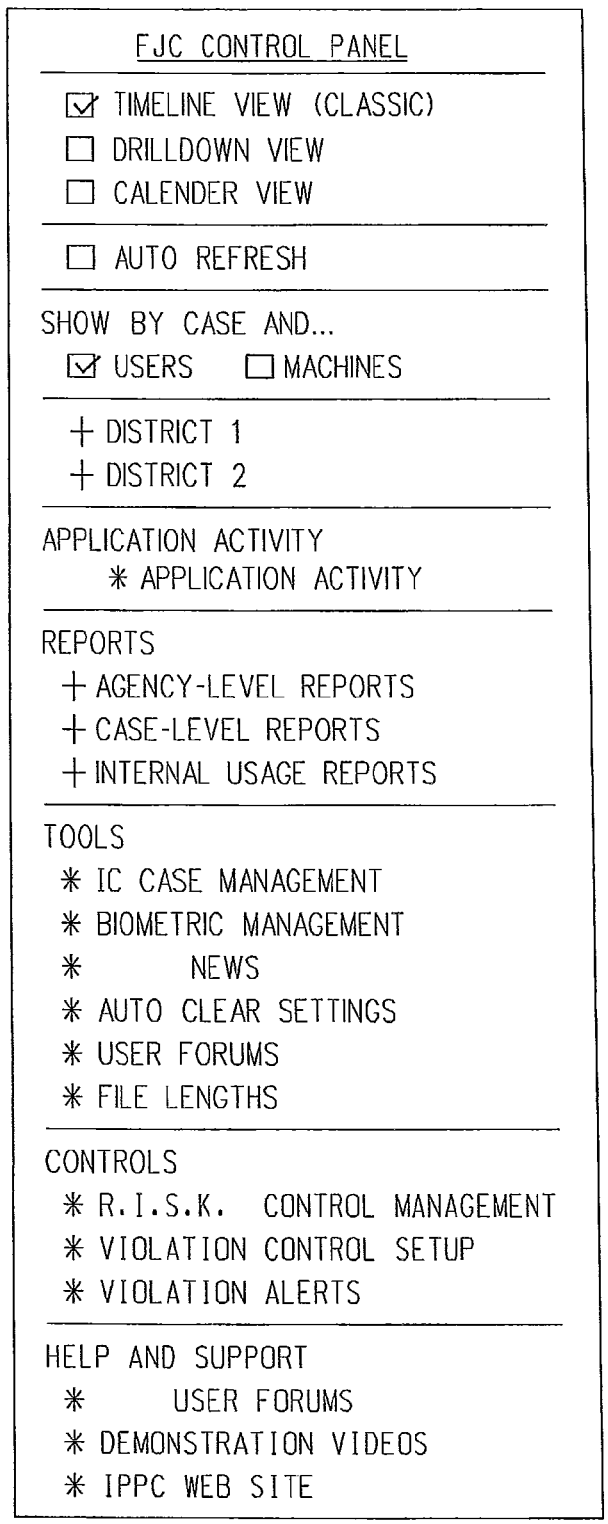
FIG. 7 is an interface useable with the computer software of the embodiment of the present invention installed on a home or personal computer of a user shown in FIG. 1 for use by an officer to gain access and control the use of said computer via the communication network (the Internet) shown in FIG. 1.

Computer software installed on server computer 10*b* that is operative for interfacing with computer software 14 that is installed on each user computer 10*a* implements the interface of FIG. 7 that enables officers to access and control managed users. The computer software installed on server computer 10*b* causes server computer 10*b* to: review and sort data received from each user computer 10*a*; generate user activity reports; identify high risk behaviors and configure violations and R.I.S.K. (Records Identifier and Sorting by Keywords, phrases and applications) alerts, including triggering screenshots e-mail/pager alerts; and generate an audit report for court presentation. An audit report is a composite of records stored on server computer 10*b* from a particular user computer 10*a* identified by officers and consolidated into a report for presentation to a court.

Desirably, the interface of FIG. 7 is entirely web based and allows officers the ability to remotely view a monitored users' activity stored on server computer 10*b* from anywhere at any time. It desirably offers a hierarchical view, offering layers of viewing, access management and relevant reporting features. All user computers 10*a* that are monitored can be viewed independently or collectively via server computer 10*b*.

A reviewer can select a certain user and see everything that the user is doing online as well as any applications that are running and what files were accessed. The reviewer can also use the interface of FIG. 7 to set up screenshots when a particular program is running or assign certain keywords that will be highlighted when found and suitable alert generated when said keywords are found. The interface of FIG. 7 allows all data to be marked as reviewed or audited in order to better sort the data. Officers are viewing data that is generated from the users' machines 10*a*, they are not viewing the machine directly.

Server computer 10*b* can implement any suitable and/or desirable type of hierarchical structure desired. Access and permissions to levels of data can be determined by username and password configured on server computer 10*b*.

The officer ID code refers to the database location for the offender/defendant data storage. When the officer installs computer software 14 on user computer 10*a*, the officer ID code is what is installed on the user computer 10*a* to dictate the data flow. FIG. 3 shows an exemplary installation configuration screen that can be displayed by computer software 14 for entry of, among other things, the officer ID code.

Data stored on server computer 10*b* can be accessed by each officer inputting his username and password into an interface (not shown) e.g., on monitor computer 10*c* and/or device 10*d*; hosted by server computer 10*b*. Inputting a suitable username and password, will cause server computer 10*b* to open a control a panel and the corresponding data of the managed individual will populate the fields of the control panel as shown, for example, without limitation, in FIG. 8.

This interface enables the officer to query on violations, R.I.S.K. records, as well as all the data generated by user computer 10*a* that is stored on server computer 10*b*. For example, the first column indicates a violation which resulted from a managed user ATTEMPTING to engage in an inappropriate behavior. The officer need only click on the link and it will expand the entire communication—inbound and outbound—for display. This display can include columns for storing reason(s) why a behavior was stored; and for storing an indication why one or more activities were blocked. The display can further include a so-called R.I.S.K. column for storing data regarding Internet data of user computer 10*a* that were permitted to be sent or received that include content that the account holder, typically the officer, deemed inappropriate. Screensshots can be denoted as "Images" in the "Source" column of FIG. 8. Officers can then select the item to be "audited" and, from there, to generate a report, an "audit report", that can be used for court presentation.

For example, the first activity record of FIG. 8 represents a violation. The Keyword "Nazi" was detected in the content of the e-mail. Therefore, the e-mail was not transmitted. However, the officer can read the content of the e-mail by clicking on the "Site" column, which refers to the e-mail address of the intended recipient. The "subject column" reflects the subject information in the e-mail. In this case the subject was "The Nazi Party is alive."

Another aspect of the computer software 14 running on user computer 10*a* and the operation of server computer 10*b* is the capability to remotely configure the controls of user computer 10*a* in real-time. Because server computer 10*b* and the computer software 14 running on user computer 10*a* are in constant (or substantially constant) communication with each other, all controls, updates, verifications, violations and R.I.S.K. alerts can be updated in the computer software 14 running on user computer 10*a* in real time. Changes to computer software 14 running on user computer 10*a* can be made by uploading new or altered components to server computer 10*b* and then automatically downloading these components to user computer 10*a* for updating the computer software 14 running on user computer 10*a*. This includes automatic updates, which assures that individual (offenders/defendants) are being monitored with the most up-to-date version of the computer software 14 running on user computer 10*a*.

Server computer 10*b* can generate suitable reports, by case number, to officers that are e-mailed directly to them. These reports can include, without limitation: Violation/RISK Activities, Top 100, Hourly Use, Daily Use, Internet Category Report, Time Spent at Category, Web Search Terms, and Files Stored on External Drives.

Server computer 10*b* can be operative for communicating with each user computer 10*a* and for setting the access rights of each user computer 10*a* based on internet protocol, time restrictions, web site category and keyword control. Server computer 10*b* can also be responsible for collecting all Internet related monitoring data and storing it in a suitable database. The type of information that is collected by Server computer 10*b* can include: web pages, ftp sites, newsgroups, e-mail, web mail and chat information that is accessed by a user computer 10*a*. Furthermore, application activity reports are transmitted from user computer 10*a* every five minutes to server computer 10*b* detailing the programs running on computer 10*a*; the files accessed, created and saved; and the location of where those files are stored on user computer 10*a*. While only one server computer 10*b* is shown in FIG. 1 and discussed herein, it is envisioned that the functions of server computer 10*b* described herein can be distributed across two or more server computers as deemed suitable and/or desirable by one of ordinary skill in the art.

Server computer 10*b* can also analyze data being collected and alert the data reviewer to various violations or areas of concern. In the community corrections field, agencies utilize the terms "passive" and "active" monitoring. Because community corrections agencies are not staffed 24 hours a day-7 days a week, active monitoring is used with discretion. Therefore, server computer 10*b* can be configured to identify a specific user computer 10*a* that should be actively monitored and provided with immediate alert notifications. Therefore, violations and/or R.I.S.K. activities on each of these specific user computers 10*a* can cause server computer 10*b* to generate one or more immediate notifications. These tagged records, R.I.S.K. activities and violations, can generate a notification alert, via e-mail and/or text message, that is transmitted within a predetermined period of time, e.g., two minutes, of the occurrence of the prohibited activity. This is done by a code segment running on server computer 10*b* which scans for new violations and R.I.S.K records. When a violation is found, a look-up process is launched to identify all the e-mail addresses configured in server computer 10*b* should be alerted to this activity and server computer 10*b* sends out corresponding e-mails and pager notifications. The notification desirably indicates the case number of the monitored user, the date and time of the activity, the control that triggered the alert and the prohibited or high risk behavior that caused the alert. The officer can then log into server computer 10*b* to gain more insight into the behavior to determine their next course of action.

Desirably, server computer 10*b* communicates with each user computer 10*a* via the Hypertext Transfer Protocol (HTTP) and all transmissions are securely encrypted using a so-called Triple Data Encryption Standard (Triple DES) algorithm.

Server computer 10*b* can be operative for providing any requesting user computer 10*a* with information pertaining to the most recent plug-ins (described hereinafter) for the corresponding instance of the computer software 14 running on user computer 10*a*, as well as any settings for each plug-in. This information is used by each user computer 10*a* to update itself with any new versions of monitoring software and check that the computer software 14 running on user computer 10*a* has not been removed or tampered with. Each plug-in that is deployed to a user computer 10*a* performs a specific task which is discussed in more detail below.

Regarding data storage, the flow of data begins at a user computer 10*a* then travels to server computer 10*b*. From server computer 10*b*, the data gets parlayed to a database that is designated by the officer, which database desirably corresponds to the officer's agency database hosted by server computer 10*b*. Server computer 10*b* is separate from each user computer 10*a* to protect against an individual (offender/defendant) hacking into server computer 10*b*. Furthermore, all the data on server computer 10*b* is desirably encrypted. Each record on server computer 10*b* has an algorithm applied (MD5) to it to ensure to the court that the data had not been tampered with or altered during transmission or storage.

Additionally, the data can be separated in databases based on the Branch of Government that owns it. For example, the United States Probation and Pretrial Services is an agency funded and controlled by the Federal Judicial Branch of Government. States typically fund and manage their probation and parole departments through Executive Branches of Government. The Judicial Branch's data is partitioned separately from the individual databases that are owned by the Executive Branches of Government.

The computer software 14 running on user computer 10*a* is software that is court-ordered to be installed on user computer 10*a* (e.g., an offender's/defendant's home, work or school computer) to manage the user's computer and Internet use. The computer software 14 running on user computer 10*a* can be operative to block all of the internal and external communications ports of user computer 10*a* and/or manage all computer and Internet communications of user computer 10*a*. The method of installation of computer software 14 can be determined by the court. Installation of computer software 14 on the user computer 10*a* to block all connectivity can only be done from the Internet Management Toolkit (FIG. 5) in the manner to be discussed in more detail hereinafter.

Some of computer software 14's features and functionalities are derived from existing technologies and others are unique to computer software 14. The core component of computer software 14 is titled WMProc. WMProc serves a multitude of functions. WMProc is an executable and is installed at the core level of user computer 10*a*. WMProc serves as the "brain" of the computer software 14 running on user computer 10*a* and controls all the features that are to be utilized on each user machine 10*a*. Although only one user computer 10a is shown, it is envisioned that a plurality of user computer 10a coupled to Internet 8 can be monitored by server computer 10b.

A computed hash value is a "fingerprint" that uniquely identifies data that has been sent from user computer 10a to server computer 10b, along with the hash value. Each record or file generated by user computer 10a is computed with a MD5 hash value by user computer 10a. Server computer 10b computes a MD5 hash value on the same record or file upon receipt and compares the hash values to verify that the hash values are identical. This check provides assurance to the court that no person or thing has interfered with the data while it was in transit or stored on server computer 10b and/or that the data was not corrupted as it passed over Internet 8. If the hash values do not match, sever computer 10b then sets aside (does not use) the transmitted data record.

At a suitable time, user computer 10a makes a request via HTTP to server computer 10b for an updated configuration file. When making this request, user computer 10a sends the MD5 hash value of current configuration file to server computer 10b. In response, server computer 10b retrieves from its database the configuration file for user computer 10a and compares the hash value of the configuration file with the one the user computer 10a provided. If the hash values match, then server computer 10b indicates to WMProc that user computer 10a has the most up to date configuration file. If the hash values do not match, then server computer 10b downloads the updated configuration file to user computer 10a. WMProc then overwrites the old configuration file with the new one. This also prevents modification of the configuration file since it will be overwritten it if has been inappropriately modified. User computer 10a is operative to occasionally or periodically run the configuration file checking process, e.g., run every two and half minutes. This process enables remote configuration in real time (e.g. run every two and half minutes) to support rapid response to changing court conditions i.e. blocking access to chatrooms.

The WMProc configuration file is separated into a settings section, an executable section and a services section, which will be described next.

The settings section of WMProc includes overall values of the computer software 14 running on user computer 10a, such as, without limitation, what server and port to send data to, how often to check for new configuration information, etc.

The executable section of WMProc lists all of the files of the computer software 14 running on user computer 10a that are not plug-ins. These are files that run independently on user computer 10a. Each file also has associated therewith an MD5 hash value that can be compared to the hash value determined for the file by user computer 10a. If the hash values are different, WMProc will download an updated executable file to user computer 10a and overwrite the old one. This enables the computer software 14 running on user computer 10a to automatically update an executable file program and, if an executable file has been modified or deleted, to automatically replace the file.

The services section of WMProc defines all the plug-ins that should run on user computer 10a. This section is similar to the executable section in that it includes the hash value for each plug-in that is compared to the hash value determined for the current plug-in on user computer 10a. It may also include custom parameters that are specific to a plug-in. This can result from unique configurations established by the officer, such as a victim's name, to trigger screenshots for a particular monitored user. These additional parameters are stored in storage 12 of user computer 10a by WMProc and used when invoking the various plug-ins.

One parameter that may be stored in the services section of WMProc for each plug-in is the time interval between each running of the plug-in. For example, if a plug-in S006 should run every one minute, the S006 configuration file contains a parameter of interval="60000". This value is in milliseconds which indicates that this plug-in should run every 60,000 milliseconds or every one minute.

Once all the executables and plug-ins are downloaded and installed in user computer 10a, WMProc analyzes the interval data for each plug-in and finds the minimum interval. WMProc then starts a timer that goes off (times-out) at the minimum interval. Each time the timer goes off, it checks its list of plug-ins. If a plug-in should be run at this slice in time, the computer software 14 running on user computer 10a executes the plug-in with any parameters that were defined in the corresponding configuration file. Once all of the plug-ins have been checked, WMProc restarts the timer and waits until it goes off again. Note that each plug-in is run in its own thread so that multiple plug-ins can run simultaneously.

Occasionally or periodically, WMProc will check with server computer 10b for new configuration files. If user computer 10a receives a new configuration file from server computer 10b, WMProc will determine which executable files and/or plug-ins have changed. WMProc will then download each new executable file and/or plug-in, verify that it was successfully downloaded by comparing hash values, stop the current executable file or plug-in from running, overwrite the old file or plug-in and restart the process. This allows the computer software 14 running on user computer 10a to be updated within minutes of any new executable file and/or or plug-in being deployed.

A plug-in S001 is responsible for sending all data that has been collected to server computer 10b. Plug-in S001 constantly monitors a directory for any new files that have been generated by other plug-ins. When plug-in S001 finds a new file, it encrypts the file, calculates its hash value and dispatches the file and hash value to server computer 10b. If server computer 10b responds that it received the file correctly (via a comparison of the hash value determined by plug-in S001 and the hash value determined by server computer 10b), the file is deleted from the user computer 10a.

Plug-in S001 also performs one or more checksum algorithms for each file in order to ensure that the file is not modified after it is logged. Two checksums are generated using the cyclic redundancy check (CRC) algorithm. The first checksum is generated for data within data collection fields: source, site, subject, version and variable data. These are common fields that exist in every type of logging that is performed by the computer software 14 running on user computer 10a. Every piece of data that is sent has this checksum attached which can be later used to verify that the data has not been modified after the data has left user computer 10a and been logged in server computer 10b. If even one character in the data is changed, then the checksum value changes, indicating that the data has been modified. This helps ensure that the data is accurate that what was logged in server computer 10b is what came from user computer 10a at a specific time.

The other CRC checksum is generated on the raw data that is sent to server computer 10b. This is just one more check that confirms that the data has not been modified. The combination of both checksums provides strong evidence of security that helps ensure that the data is accurate.

The data is formatted using Extensible Markup Language (XML), encrypted using the TripleDes algorithm and dispatched from user computer 10a to server computer 10b using HTTP. The formatting and communication of the data uses customary industry standards so that future technologies can easily take advantage of the capabilities of the computer software 14 running on user computer 10*a*.

The last piece of functionality that plug-in S001 performs is a security check. If the computer software 14 running on user computer 10*a* is installed in the "Closed" mode, which means that if the computer software 14 running on user computer 10*a* cannot communicate with server computer 10*b*, then user computer 10*a* is precluded from accessing the Internet access until a connection to server computer 10*b* is established. This prevents user computer 10*a* from going online unmonitored. If the user computer 10*a* is in closed mode and it cannot connect to server computer 10*b*, plug-in S001 will cause all Internet access by user computer 10*a* to be disabled until communication is reestablished between user computer 10*a* and server computer 10*b*. Once communication with server computer 10*b* has been reestablished, plug-in S001 causes all Internet access on user computer 10*a* to be restored. This measure is in place to avoid firewalls from interfering with the operation of the computer software 14 running on user computer 10*a*.

A plug-in S002 monitors the application activity engaged in by the user of user computer 10*a*. This includes programs running and files created, accessed, modified, read and/or stored. Files sent to server computer 10*b* for officers to review include the path and types of files accessed, including those on external storage devices such as a flash drives, which are often used to store digital contraband. Furthermore, specific programs can be selected to trigger screenshots when in use. For example peer2peer programs are often used by sex offenders to download and view child pornography. The computer software 14 running on user computer 10*a* can be configured to trigger screenshots when peer2peer networks are running. Plug-in S002 continuously monitors all applications and collects information pertaining to the applications and files accessed.

At five-minute intervals, this information application activity file, is put into a file to be transmitted by plug-in S001 to server computer 10*b* for review by the officer. Once this file is successfully written, plug-in S002 clears out its memory and begins logging any new information that is collected.

A plug-in S003 is a specialized plug-in for users using America Online (AOL) to access the Internet. AOL deviates from normal Internet standards for communicating via chat and e-mail. Plug-in S003 scans for any open AOL chat or e-mail windows and records any data that is entered or received in these windows. Any data that is collected is recorded to a file and transmitted to the server by plug-in S001.

A plug-in S004 has a so-called "Smart" Design with Self Healing Intelligence. The purpose of plug-in S004 is to avoid a user (offender/defendant) navigating unmonitored and to avoid officers from having to go out in the field to troubleshoot user computer 10*a*. The functionality inherent to plug-in S004 addresses tampering with the computer software 14 running on user computer 10*a* and automatically rectifies any issues should the computer software 14 running on user computer 10*a* be affected by tampering. For example, if a directory is deleted or a process is manually stopped, plug-in S004 operates to detect and then rectify the situation. Plug-in S004 runs, for example, every two and half minutes, making it difficult to circumvent the operation of the computer software 14 running on user computer 10*a*.

The computer software 14 running on user computer 10*a* is desirably configured with so-called "auto-fix" capability which is the responsibility of plug-in S004. Due to the inherent nature of monitoring internet and machine activity of user computer 10*a*, the computer software 14 running on user computer 10*a* deploys various components that resemble spyware applications. Because of this, several commercial and free spyware removal tools attempt to remove the computer software 14 running on user computer 10*a*. Accordingly, plug-in S004 is operative for automatically fixing and/or repairing files damaged or removed by spyware removal tools. This same feature also restores components that have been intentionally removed by a user of user computer 10*a*.

Approximately every two and half minutes, plug-in S004 executes. Upon execution, plug-in S004 checks a variety of settings and component files and verifies that all the setting and component files are installed and/or functioning properly. If it finds anything amiss, plug-in S004 will attempt to correct the problem while sending an alert message to server computer 10*b* and, hence, the officer, indicating what was wrong and that was fixed. One of the first items plug-in S004 checks is to ensure that one or more so-called layered service providers (LSPs) are installed since LSPs are the main Internet 8 monitoring component of the computer software 14 running on user computer 10*a*. If LSPs are not installed, then Internet 8 activity will go unmonitored. To prevent this from occurring, plug-in S004 will occasionally or periodically, e.g., every two and half minutes, assess if any LSPs are missing. If an LSP is missing, plug-in S004 will reinstall the LSP and present a dialog box to the user that user computer 10*a* will perform an automatic restart after a predetermined interval of time, e.g., without limitation, restart in five minutes. A restart is necessary every time an LSP is installed or uninstalled. Simultaneously, communication notices are dispatched to server computer 10*b* for review by an officer to notify him of what has occurred on user computer 10*a*. This same process happens if a foreign LSP is installed.

Because the computer software 14 running on user computer 10*a* is court ordered, it has priority over other applications. Hence, plug-in S004 ensures that only the LSPs of the computer software 14 running on user computer 10*a* are installed, as other third-party LSP's may interfere with the monitoring or prevent certain activates from being monitored. Therefore, if an LSP other than an LSP of the computer software 14 running on user computer 10*a* is found on user computer 10*a*, plug-in S004 will remove and reinsert the LSPs required for said computer software 14 to function properly. Plug-in S004 will then cause user computer 10*a* to automatically reboot. If a situation arises where the foreign LSP reinserts itself, plug-in S004 will remove it a predetermined number of times, e.g., three times, after which, a message will be sent to server computer 10*b* and, hence, the case officer, to take corrective action.

The concern raised by such a scenario is that it is possible for plug-in S004 and foreign LSPs to get into a "tug of war", whereupon plug-in S004 removes the foreign LSPs and reinserts the LSPs of the computer software 14 running on user computer 10*a* indefinitely, rendering user computer 10*a* inoperable. To avoid this from occurring, the LSP's of the computer software 14 running on user computer 10*a* will be reinstalled a predetermined number of times, e.g., three times, within a predetermined period of time, e.g., two hours. After the last installation within the predetermined period of time, a message is sent to server computer 10*b* for the officer with a recommendation to take corrective action along with a suitable error code. Corrective action can include performing an analysis of user machine 10*a* to uncover what is causing the conflict and then resolving the conflict.

Besides fixing LSPs, below is a list of all the other components that plug-in S004 checks and how it reacts if it finds something is amiss:

Verify that the component that handles information from LSPs and sends it to the server computer 10b is operative;

Validate that the registry entries for this component are correct and, if not found, then recreate the registry entries;

Ensure that all directories that are needed for this component to function are in existence and, if not, create all necessary directories;

Validate that the setting to automatically start this component when user computer 10a is booted is in the registry;

Ensure the main component (a windows service) for an application activity data collection is installed and running and, if not, then install it. If the main component is not running, then start the process;

Verify the registry settings for the monitoring components of user computer 10a exist and are correct. If not found or an incorrect setting exists, then update the registry settings with the correct settings;

Validate that all directories for the computer software 14 running on user computer 10a exist. If not, then create each necessary directory; and Determine that the setting to start up the monitoring component of the computer software 14 running on user computer 10a is set in the registry. If not, then recreate the setting.

A plug-in S005 is operative for remote uninstall of computer software 14. Circumstances, such as a probation violation followed by immediate incarceration, or a defendant found not guilty, often preclude officers from gaining access to the user computer 10a that is being managed by computer software 14. To address this, server computer 10b is operative for enabling officers to remotely uninstall computer software 14 via an "Uninstall on this Machine" link in the case management interface of FIG. 3.

Once the link is selected to uninstall computer software 14, provided the user computer 10a is connected to the Internet, the uninstall will automatically occur within a predetermined period of time, e.g., without limitation, five minutes. Plug-in S005 propagates a configuration change to include plug-in S005 on user computer 10a. When user computer 10a is marked for uninstall, its configuration changes to include the S005 plug-in for execution. When this plug-in is run on user computer 10a, it verifies that a certain option is set in the configuration and calls the uninstall program from server computer 10b which removes the LSPs and deletes all files associated with the computer software 14 running on user computer 10a, including all the plug-ins. Once uninstalled (within the predetermined period of time if user computer 10a is connected to the Internet), plug-in S005 dispatches a message to server computer 10b indicating that the uninstall was successful and prompts the user of user computer 10a to reboot user computer 10a. Once user computer 10a is rebooted, it removes the computer program 14 installed on user computer 10a and causes a notice that said computer program 14 has been uninstalled to be displayed. Once uninstalled, the case management area of the case management interface (FIG. 3) will be updated accordingly. Simultaneous notification can be provided to the officer via e-mail or a text message.

Plug-ins S006 and S100 cooperate to trigger screenshots and controls. Because of existing U.S. Federal case law, random screenshots are no longer tolerated by the courts. The courts require that a nexus be established between screenshots taken and an individual's (offender's /defendant's) propensity to commit a crime. For example, it is reasonable that an officer may need to see screenshots of movies being viewed by an individual convicted of a sex offense that is on probation. However, it may be considered unreasonable to take screenshots when the individual is using QuickBooks. Therefore, the computer software 14 running on user computer 10a is desirably configured to take screenshots at predetermined intervals, e.g., once a minute, when a certain program or programs are running or keywords/phrases are detected. To this end, plug-in S006 acquires configuration settings from server computer 10b which indicate to plug-in S006 the event(s) that should trigger screenshots. Plug-in S006 periodically scans all the running processes on user computer 10a looking for a match. If a program is found that it should take screenshots for, plug-in S006 sets a global system flag that indicates to plug-in S100 that a screenshot should be taken. Plug-ins S006 and S100 are executed at predetermined intervals, e.g., once a minute. Plug-in S006 will turn the global screenshot flag on (or off) if there is a program running that should (or should not) trigger screenshots. Plug-in S100 checks the global screenshot flag to determine if it is "on". If it is "on", plug-in S100 takes a screenshot, converts it to a colored image and resizes it to a maximum resolution of 800×600 pixels (or any other suitable and/or desirable resolution) to consume less bandwidth and disk space on server computer 10b. The screenshots are taken in color to facilitate presentation to the courts in PDF format. Once a screenshot has been generated, it is collected by plug-in S001 and dispatched to server computer 10b via Internet 8 for access by an officer or any other suitable and/or desirable reviewer.

A plug-in S007 monitors and captures chat messages such as, without limitation, messages in the Gaim, Trillion and any other chat protocol.

Lastly, a plug-in S008 controls the biometric functionality of computer software 14. If user computer 10a does not have biometric functionality, then plug-in S008 is not installed.

The Internet Management Toolkit of FIG. 5 is implemented as a menu driven 1 gigabyte flash drive device that promotes officer safety by facilitating one-step selection of various tools and functionalities of the computer software 14 running on user computer 10a. An exemplary Internet Management Toolkit interface is shown in FIG. 5. The Internet Management Toolkit is menu driven and may be pre-configured with the agency Officer ID, enabling the officer to simply, easily and accurately have the computer software 14 running on user computer 10a perform one or more of the following Internet management tasks: permit an individual (offender/defendant) Internet access while monitoring that access; block all Internet access including VMWare, peer2peer networks and remote desktop applications, while optionally notifying server computer 10b if a connection is made; verify that the files of computer software 14 are installed and functioning properly; and download and subsequent upload of activity reports detailing files created, where those files are stored and the programs used to access those files. Each of the foregoing tasks can be set with one click functionality and the one gigabyte flash drive can be used for storage data collected by the computer software 14 running on user computer 10a.

In addition, the Internet Management Toolkit can enable officers to download computer software 14 into multiple user computers 10a when doing field visits; one step uninstall of the program files comprising computer program 14 installed on a user computer 10a; biometric integration (discussed hereinafter) and Internet Management Toolkit updates.

While other technologies exist that can block Internet traffic, the computer software 14 running on user computer 10a is operative for blocking all Internet and communication ports while only allowing communication to server computer 10b for violation notification. Violation notification is used to notify officers if an individual using a user computer 10a is violating his court condition by connecting to Internet 8. To this end, Internet communications remain blocked, but the officer is notified.

The component that blocks all access to Internet 8 is a so-called Network Driver Interface Specification (NDIS) driver that scans all TCP traffic passing into and out of user computer 10a. This driver sees each TCP packet and scans its destination IP address. If the address is one of server computer 10b, the driver allows it to pass through. If the IP address does not match an IP address of server computer 10b, the driver discards the packet. Therefore, access to Internet 8 is disabled except to server computer 10b.

The Internet Management Toolkit can include a computer software 14 file verification tool. Because computer software 14 can be installed remotely, it is desirable to provide a means for verifying that computer software 14 is indeed installed on a specific user computer 10a—versus another computer. Furthermore, this feature is useful for periodic checks of the integrity of the computer software 14 running on user computer 10a. To this end, upon execution, the file verification tool verifies that computer software 14 files are present on a specific user computer 10a and are functioning properly. It also ensures that the user of user computer 10a is complying with a court order regarding his use of user computer 10a, while avoiding the need for officers to spend time searching for computer software 14 components during a field visit. In order to determine that computer software 14 is installed correctly, the file verification tool checks that the correct LSP's are installed and that WMProc.exe and any other desirable processes of computer software 14 are running. If the LSP's are not installed or any of the desirable processes are not running, the file verification tool causes a suitable error message to be displayed to the office.

The Internet Management Toolkit can also be operative for facilitating the retrieval of data collected by computer software 14 when installed on user computer 10a to deny access to Internet 8. With a single click, the collected data can be downloaded into the flash drive. Any collected data downloaded into the flash drive can subsequently be uploaded into server computer 10b for subsequent retrieval and analysis. If, for example, the collected data reveals the presence of digital contraband on user computer 10a, the computer software 14 running on user computer 10a can be programmed to include a screenshot capture trigger in combination with "no Internet access".

The Internet Management Toolkit includes two code segments that work together to get the monitored information to server computer 10b in the case of an offline installation where there is no connection to Internet 8. Files that are stored on user computer 10a that contain monitored data are stored encrypted using the tripleDES algorithm. This ensures that the files are not tampered with before being downloaded onto the Toolkit.

The first code segment retrieves any files that were collected in the offline mode. When a suitable menu item of the Internet Management Toolkit is launched, files that end with a predetermined extension, e.g., the extension "ic", are downloaded onto the flash drive coupled to user computer 10a. While doing this, the Internet Management Toolkit causes the progress of the copy to be displayed on the monitor 16 of the user computer 10a so that the officer knows that the copy is complete. As files are successfully copied, they are deleted from the user computer 10a.

Next, the officer plugs the flash drive into any Internet connected machine, whereupon the second code segment (under the control of the officer) uploads the files to server computer 10b in a storage area dedicated for the individual associated with the user computer 10a for review by the officer through a web interface.

When the officer is logged on server computer 10b, the web interface displays each file that was created on user computer 10a and the original time the file was created.

Computer software 14 is deeply embedded in the Windows operating system. In order to successfully uninstall computer software 14, a password is usually required. The Internet Management Toolkit enables one-click uninstall. Specifically, the Internet Management Toolkit contains a version of the uninstaller that requires no password and will only execute from the Toolkit installed on the flash drive. Therefore, uninstalling from the Toolkit is a simple, one-click process. This uninstaller also does not need an Internet connection to uninstall computer software 14. The uninstall process performs the following steps:

Uninstall LSPs;
Stop execution of the WMProc executable and any other executables of computer software 14;
Delete WMProc, all plug-ins and any other executables of computer software 14;
Remove any registry entries associated with computer software 14;
Stop Application Activity service, uninstall the service and remove files;
Add entry in the RunOnce registry key to run the uninstaller with a command line of UINS when the user computer 10a restarts to remove components that cannot be removed until the machine restarts;
Prompt the user that user computer 10a will reboot;
Once the machine is rebooted, the RunOnce key executes the uninstaller once more;
Delete LSP dll;
Display a dialog box that uninstall was successful; and
Initiate script to delete the uninstall program.

Once the uninstall process is complete and all the components of computer software 14 have been removed, user computer 10a will no longer be monitored.

Biometric integration of the computer software 14 running on user computer 10a incorporates fail-safe mechanisms to reduce the likelihood of circumvention by those that must be monitored from utilizing a non-monitored user's login, while ensuring those not on supervision that their right to privacy will not be impacted.

Biometric integration of the computer software 14 running on user computer 10a enables a link to be established between activities occurring on user computer 10a and the identity of the individual responsible for those activities, while providing an alternative to monitoring all users accessing user computer 10a. For example, courts have been reluctant to monitor machines placed in common areas accessible to individuals unrelated to the offender/defendant, a dorm, for example, due to privacy concerns.

To avoid an individual (offender/defendant) from altering the biometric enrollments, the programs required to run the biometric installation and enrollment process are limited to the Internet Management Toolkit shown in FIG. 5.

To initialize biometric control on user computer 10a, the computer software 14 running on user computer 10a is initially installed on user computer 10a. Next, the Biometric Install option of the Internet Management Toolkit is selected. Selection of this option causes the device drivers of a third party biometric device 7 (shown in FIG. 1) and a third party algorithmic authentication protocol to be installed for use by computer software 14.

Thereafter, all users and potential users of user computer 10a must have a biometric algorithm prepared of their fingerprints. This will occur with case manager oversight, with each person logging into a suitable biometric algorithm interface and then having his/her algorithm matched to his/her windows login.

The biometric control installed for use by the computer software 14 running on user computer 10a can be set via the Internet Management Toolkit to NOT monitor any user other than the individual designated to be monitored. All users with access to user computer 10a, however, will be required to have his/her fingerprint algorithm created. This algorithm will be mapped to the login on user computer 10a which can then be identified as by case number and username on user computer 10a for establishing controls and identifying case/user activity occurring on user computer 10a.

The computer software 14 running on user computer 10a is operative to randomly require re-authentication of the current user of user computer 10a by displaying a suitable notice on the monitor 16 of user computer 10a that re-authentication is required within a predetermined time interval of the notice being displayed. The re-authentication by the computer software 14 running on user computer 10a can be configured remotely from server computer 10b as necessary. For example, an individual monitored in a work environment might be permitted more time to re-authenticate than an individual using his/her user computer 10a in a home environment. Also, the random intervals might be shorter or longer depending on the environment. The notices will be launched from plug-in S008 installed on user computer 10a but will "read" the intervals from a biometric control module for the individual that resides on server computer 10b.

During active use of user computer 10a, the request to re-authenticate will occur at random intervals. The request can be presented in the form of a pop-up window. However, this is not to be construed as limiting the invention. This pop-up window will require a response from the individual using user computer 10a. The amount of time to respond can be configured by the case manager at server computer 10b and will be dependent upon the environment where user computer 10a is installed. The time to respond can be configured by the case manager, but will have a predetermined default response time of, for example, without limitation, 10 seconds.

Plug-in S008 can cause a biometric scan did not match the current user message to be dispatched to server computer 10b for storage and subsequent review when the individual using user computer 10a has exceeded the allowable number of re-authentication attempts.

Plug-in S008 can cause a monitored user missed allowed timeframe to scan finger message to be dispatched to server computer 10b for storage and subsequent review when the individual using user computer 10a has failed to re-authenticate within the allowable timeout period.

Plug-in S008 can cause a biometric device could not be found message to be dispatched to server computer 10b for storage and subsequent review when the biometric device is not plugged into user computer 10a.

Plug-in S008 can cause a monitor user clicked the cancel button instead of scanning a finger message to be dispatched to server computer 10b for storage and subsequent review when the individual using user computer 10a ignores the biometric authentication prompt by selecting a cancel button thereof. To avoid the user from canceling the biometric prompt, the mouse and keyboard of user computer 10a can be disabled each time a re-authentication prompt appears.

Plug-in S008 can cause a biometric scan matched current user message to be dispatched to server computer 10b for storage and subsequent review when re-authentication has succeeded.

Plug-in S008 can cause a maximum failed authentication attempts reached message to be dispatched to server computer 10b for storage and subsequent review when user computer 10a is forced to shut down because of a failed re-authentication action.

Plug-in S008 can cause a "biometric device had an error" message to be dispatched to server computer 10b for storage and subsequent review when user biometric device malfunctions.

Plug-in S008 can cause a "could not find or corrupt fingerprint data for this user" message to be dispatched to server computer 10b for storage and subsequent review when user computer 10a could not authenticate due to a non-enrolled user or corrupted fingerprint data.

Biometric Reports of messages dispatched to server computer 10b by plug-in S008 can be generated occasionally or periodically to provide a summary of the biometric activities occurring on user computer 10a along with their corresponding details. For quick review, the messages dispatched to the server are summarized in a report, as shown in the exemplary Biometric Report of FIG. 9.

To facilitate the management of individuals (offenders/defendants), different attributes and language used by offenders/defendants can be input into global profiles for officers to implement their violation and/or R.I.S.K. words and applications. These global profiles can be availed for selection by an officer for use on each type of different offender. Each global profile used with an instance of computer software 14 can also be customized for a particular individual (offender/defendant). The benefit of such global settings is that upon learning of violation/R.I.S.K. words and applications from officers in one part of the country, violation/R.I.S.K. words and applications as global settings can be made available to officers throughout the country.

The computer software 14 running on user computer 10a can also or alternatively be used for distance learning applications for detention centers, probation/parole officers and prisons. Specifically, the "allow list" of the computer software 14 running on user computer 10a can be customized and updated as needed to provide Internet 8 access to allowed web sites that host distance learning courses to each individual using a user computer 10a operative in the manner discussed above. In addition, the computer software 14 running on user computer 10a can be configured for each individual user to allow specific e-mail addresses (children communicating with mothers and fathers), software programs, i.e., resume building programs, while blocking out all other unapproved resources, such as, without limitation, peer2peer programs, newsgroups, and bloggers. These allowed resources can be configured uniquely for each individual user of a user machine 10a.

An alert can be sent to an administrator of a distance learning application of the computer software 14 running on user computer 10a should an attempt be made to access materials not specifically tailored for that monitored and controlled individual.

If multiple users have access to the same user computer 10a, the activity detail of each user can be recorded and stored at server computer 10b by each user's name. All controls are desirably managed by username. Each user has a tailored list of permitted content that can be configured in the computer software 14 running on user computer 10a for said user. This list is configured on server computer 10b which generates a permission-based handshake with each user of computer 10a. The tailored list presents to the user as a web page. Users may log into any user computer 10a with computer software 14 installed thereon with his/her username and password. Upon logging in, the user is presented with his/her unique webpage of preconfigured resources.

Administrators can view all activity remotely to gauge usage patterns. Automatically generated and e-mailed reports can be submitted to the administrator occasionally or periodically. These reports include the Top 100 Activities, Hours Accessed, Daily Use, Web Categories of Use and Time spent at each category and Violations (if any). Should a controlled user attempt to gain access to unsanctioned materials, the administrator will be notified immediately by a transmission that was generated through the specifically designed web interface. These notification alerts can be received in e-mails, pagers and cell phones, enabling immediate e.g., two minute intervention and, if necessary, punitive sanctions.

As an example, a drug and alcohol treatment facility may want to provide online resources to patients, enabling them to renew their driver's licenses, apply for Medicaid, obtain an accountability partner from AA, receive remedial education and job preparedness resources. However, there are great concerns about providing unstructured access. Computer software 14 provides a secure platform from which these resources, and only these resources, can be accessed. If any of these resources have live connecting links, the patient can ONLY access those live links if they have been pre-configured on server computer 10b. If the patient attempts to gain access to a live link that is not sanctioned, a violation record will be recorded on the server computer 10b, which will generate an alert to the administrator in the form of e-mails, pagers and/or telephone messages within a predetermined time interval of the occurrence of the violation.

All activity is catalogued on the server computer 10b for subsequent retrieval and review, by patient and/or case ID number (preserving confidentiality) for administrator viewing. In addition, on an occasional or periodic basis, the administrator can receive weekly reports, via, for example, e-mail, detailing the type of activity, the hours of use, days of use most active and all violations that have occurred during a period of time of interest. These reports can then be forwarded to the treatment provider in charge of the case. Each case will have it's own set of e-mails and controlled content.

The computer software 14 running on user computer 10a can include a number of components that work together to achieve a secure learning environment. These components include the following. The first three components have already been fully explained above. Additional components utilized are explained below:

server computer 10b;
computer software 14;
storage 12 of server computer 10b;
Citrix Presentation server; and
Thin Clients.

The Citrix Presentation is a tool that provides a common, secure Microsoft Windows desktop to any machine that attempts to connect to it. The Citrix Presentation server uses a proprietary communication technology called Independent Computing Architecture (ICA) to provide a remote desktop environment. It is an add-on to Microsoft terminal services that allows any machine that has an ICA client on it to attach to the server and use a common desktop with predefined applications installed.

In the distance learning environment, the Citrix Presentation server will be used as a centralized desktop that all user computers 10a can connect to in order to present the distance learning environment. The Citrix Presentation server is desirably configured with unique login names for every distance learning environment. Each of these logins will be in a group that corresponds the location where the user is located. For example, user ABC123 is located in Florida and user XYZ789 is located in Eastern Pennsylvania. There are two groups, one for Florida and the other for Eastern Pennsylvania and within each group at least one unique user is defined. Within each group, the Citrix Presentation server is configured to allow access to only a handful of applications. So, Eastern Pennsylvania is defined to have access to computer software 14 (so they can be monitored), Internet Explorer and Microsoft Word. Florida has everything that Eastern Pennsylvania has with the addition of access to various legal documents. Therefore, even though both locations use the same Citrix Presentation server, only user ABC123 has access to the legal documents because they are in the Florida group. If either user attempts to run a chat program, like MSN Messenger, they will be denied because the Citrix Presentation server is set to only allow certain programs to run.

The Citrix Presentation server provides a controlled environment for distance learning applications to be hosted while the computer software 14 running on each user computer 10a restricts where a user thereof can go on Internet 8 and monitors what the user is doing on Internet 8.

FIG. 10 is diagram of an example computer software 14 architecture using the Citrix Presentation Server.

As discussed above, plug-ins S006 and S100 enable screenshot triggers and screenshots of what is presently appearing on the monitor 16 of user computer 10a to be acquired and dispatched to server computer 10b. The trigging of screenshots can be based on specific keywords, applications, phrases and programs being used with user computer 10a. When a screenshot is triggered in response to the entry of a disallowed keyword or phrase, or the launching of a disallowed application or program, the image presently appearing on the monitor 16 of user computer 10a is captured and dispatched to server computer 10b for storage and subsequent retrieval and analysis.

Optionally, server computer 10b can be operative for sending an alert upon the receipt of a captured screenshot from user computer 10a. Desirably, screenshot images are transmitted to sever computer 10b in real-time, and are viewable by an officer with just an Internet connection.

Lastly, the computer software 14 running on user computer 10a can be operative for comparing hash values of e-mail attachments, sent or received, against the hash values of known child pornographic images and for blocking the transmission of such attachments in the event of a match. This avoids the dissemination of child pornography via e-mail.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of computer usage monitoring comprising:
   (a) causing a user computer to be in communication with a server computer via a computer network;
   (b) causing a listing of keywords, phrases, applications and/or programs to reside on the user computer;
   (c) causing the user computer to automatically monitor for at least one of the following:
   keywords or phrases input into an application running on the user computer; the presence of keywords or phrases in a file received by the user computer via the computer network; or
   the launching of one or more applications or programs on the user computer;
   (d) in response to the user computer detecting (1) the input of one or more of the listed keywords or phrases into an application running on the user computer, (2) the presence of one or more of the listed keywords or phrases in a file received by the user computer via the computer network, or (3) the launching of one or more of the listed applications or programs on the user computer, causing the user computer to record a digital form of at least one visual image appearing on a video monitor of the user computer;
   (e) causing the user computer to dispatch the digital form of the recorded image to the server computer via the computer network;
   (f) causing biometric data regarding a user of the user computer to be stored in the user computer via a biometric device coupled to the user computer;
   (g) causing the user computer to output on the video monitor of the user computer a re-authentication prompt for biometric input into the biometric device;
   (h) responsive to a lack of biometric input into the biometric device within a predetermined interval of time following the output of the re-authentication prompt on the video monitor of the user computer or an input of biometric data that does not match the biometric data stored in the user computer, dispatching an indication of said lack of biometric input or an indication that the input biometric data does not match the biometric data stored in the user computer to the server computer via the computer network; and
   (i) concurrent with the user computer outputting on the video monitor the re-authentication prompt for biometric input into the biometric device, causing a mouse and keyboard of the user computer to be disabled.

2. The method of claim 1, wherein, in step (c) the file is a web page.

3. The method of claim 1, wherein the computer network is the Internet.

4. The method of claim 1, wherein step (d) includes occasionally or periodically recording a plurality of images appearing on the video monitor of the user computer.

5. The method of claim 1, further including:
   causing the server computer to store the digital form of the recorded visual image dispatched in step (e) on a storage medium;
   via the server computer, recalling the stored digital form of the recorded visual image from the storage medium; and
   causing the recalled digital form of the recorded visual image to be displayed as a visual image on a video monitor associated with a computer other than the user computer.

6. The method of claim 5, further including:
   causing the user computer to determine a first hash value for the digital form of the recorded visual image;
   causing the user computer to communicate the first hash value to the server computer via the computer network;
   causing the server computer to compute a second hash value for the digital form of the recorded visual image received at the server computer;
   causing the server computer to compare the first and second hash values; and
   in response to determining that the first and second hash values match, the server computer storing in connection with the digital form of the recorded visual image an indication of said match between the first and second hash values.

7. The method of claim 1, wherein step (d) further includes:
   blocking the dispatch of the application or the listed keywords or phrases entered into the application from the user computer to the computer network;
   blocking the dispatch of a response entered into the file via the computer network; or
   blocking the input or output of data into or from the launched application or program.

8. The method of claim 1, further including:
   determining the presence or absence of one or more predetermined programs on the user computer; and
   in response to determining the absence of one or more predetermined programs installed on the user computer, the user computer downloading said one or more predetermined programs from the server computer via the computer network and installing said downloaded one or more predetermined programs on the user computer.

9. The method of claim 1, further including causing the user computer to shut down in responsive to the lack of biometric input into the biometric device within the predetermined interval of time or the input of biometric data that does not match the biometric data stored in the user computer.

10. A computer monitoring method comprising:
    (a) causing a user computer to be in communication with a server computer via a computer network, wherein the user computer has a biometric device operatively coupled to the user computer;
    (b) causing biometric data regarding a user of the user computer to be stored in the user computer via the biometric device;
    (c) causing the user computer to output on a video monitor of the user computer a re-authentication prompt for biometric input into the biometric device; and
    (d) responsive to a lack of biometric input into the biometric device within a predetermined interval of time following the output of the re-authentication prompt on the video monitor of the user computer or an input of biometric data that does not match the biometric data stored in the user computer, dispatching an indication of said lack of biometric input or an indication that the input biometric data does not match the biometric data stored in the user computer to the server computer via the computer network, wherein step (c) further includes, concurrent with the user computer outputting on the video monitor of the user computer the re-authentication prompt for biometric input into the biometric device, causing a mouse and keyboard of the user computer to be disabled.

11. The method of claim 10, further including:

(e) causing the user computer to automatically monitor for predetermined keywords or phrases input by the user into an application running on the user computer, the presence of predetermined keywords or phrases in a file received by the user computer via the computer network, or the launching of one or more predetermined applications or programs on the user computer;

(f) in response to the user computer detecting the input of one or more of the predetermined keywords or phrases into an application running on the user computer, the presence of one or more of the predetermined keywords or phrases in a file received by the user computer via the computer network, or the launching of one or more of the predetermined applications or programs on the user computer, causing the user computer to record a digital form of at least one visual image appearing on a video monitor of the user computer; and (g) causing the user computer to dispatch the digital form of the recorded image to the server computer via the computer network.

12. The method of claim 11, wherein step (f) further includes causing the user computer to block at least one of the following:

the dispatch of the application or each predetermined keyword or phrase entered into the application from the user computer to the computer network;

the dispatch of a response entered into the file to the computer network; or the input or output of data into or from each launched application or program.

13. The method of claim 10, further including:

determining the presence or absence of one or more predetermined programs on the user computer; and in response to determining the absence of one or more predetermined programs installed on the user computer, the user computer downloading said one or more predetermined programs from the server computer via the computer network and installing each downloaded program on the user computer.

14. The method of claim 10, further including causing the user computer to shut down in responsive to the lack of biometric input into the biometric device within the predetermined interval of time or the input of biometric data that does not match the biometric data stored in the user computer.

15. A computer monitoring method comprising:

(a) causing a listing of predetermined program files and/or plug-ins to reside on a user computer that is coupled in communication with a server computer via a computer network;

(b) causing the user computer to detect for the presence or absence of one or more of said predetermined program files and/or plug-ins;

(c) in response to detecting the absence of one or more of said predetermined program files and/or plug-ins, the user computer downloading said one or more absent predetermined programs and/or plug-ins from the server computer via the computer network;

(d) causing the user computer to install on the user computer said downloaded one or more predetermined programs and/or plug-ins;

(e) causing biometric data regarding a user of the user computer to be stored in the user computer via a biometric device operatively coupled to the user computer;

(f) causing the user computer to output on a video monitor of the user computer a re-authentication prompt for biometric input into the biometric device;

(g) responsive to a lack of biometric input into the biometric device within a predetermined interval of time following the output of the re-authentication prompt on the video monitor of the user computer or an input of biometric data that does not match the biometric data stored in the user computer, dispatching an indication of said lack of biometric input or an indication that the input biometric data does not match the biometric data stored in the user computer to the server computer via the computer network; and (h) concurrent with the user computer outputting on the video monitor of the user computer the re-authentication prompt for biometric input into the biometric device, causing a mouse and keyboard of the user computer to be disabled.

16. The method of claim 15, further including causing the user computer to shut down in responsive to the lack of biometric input into the biometric device within the predetermined interval of time or the input of biometric data that does not match the biometric data stored in the user computer.

17. A computer monitoring method comprising:

(a) causing a listing of predetermined program files and/or plug-ins to reside on a user computer that is coupled in communication with a server computer via a computer network;

(b) causing the user computer to detect for the presence or absence of one or more of said predetermined program files and/or plug-ins;

(c) in response to detecting the absence of one or more of said predetermined program files and/or plug-ins, the user computer downloading said one or more absent predetermined programs and/or plug-ins from the server computer via the computer network;

(d) causing the user computer to install on the user computer said downloaded one or more predetermined programs and/or plug-ins;

(e) causing the user computer to automatically monitor for at least one of the following: predetermined keywords or phrases input into an application running on the user computer, the presence of predetermined keywords or phrases in a file received by the user computer via the computer network, or the launching of one or more predetermined applications or programs on the user computer;

(f) in response to the user computer detecting the input of one or more of said predetermined keywords or phrases into an application running on the user computer, the presence of one or more of said predetermined keywords or phrases in a file received by the user computer via the computer network, or the launching of one or more said predetermined applications or programs on the user computer, causing the user computer to record a digital form of at least one visual image appearing on a video monitor of the user computer;

(g) causing the user computer to dispatch the digital form of the recorded image to the server computer via the computer network;

(h) causing biometric data regarding a user of the user computer to be stored in the user computer via a biometric device operatively coupled to the user computer;

(i) causing the user computer to output on a video monitor of the user computer a re-authentication prompt for biometric input into the biometric device;

(j) responsive to a lack of biometric input into the biometric device within a predetermined interval of time following the output of the re-authentication prompt on the video monitor of the user computer or an input of biometric data that does not match the biometric data stored in the user computer, dispatching an indication of said lack of biometric input or an indication that the input biometric data does not match the biometric data stored in the user computer to the server computer via the computer network; and (k) concurrent with the user computer outputting on the video monitor of the user computer the re-authentication prompt for biometric input into the biometric device, causing a mouse and keyboard of the user computer to be disabled.

18. The method of claim 17, further including causing the user computer to shut down in responsive to the lack of biometric input into the biometric device within the predetermined interval of time or the input of biometric data that does not match the biometric data stored in the user computer.

\* \* \* \* \*